(12) United States Patent
Vaniglia et al.

(10) Patent No.: US 12,227,327 B2
(45) Date of Patent: Feb. 18, 2025

(54) SUSTAINABLE FILM POUCH MACHINE

(71) Applicant: R.A Jones & Co., Covington, KY (US)

(72) Inventors: Milo M. Vaniglia, Cold Spring, KY (US); Robert M. Kalany, Florence, KY (US)

(73) Assignee: R.A Jones & Co., Covington, KY (US)

(*) Notice: Subject to any disclaimer, the term of this patent is extended or adjusted under 35 U.S.C. 154(b) by 9 days.

(21) Appl. No.: 18/245,642

(22) PCT Filed: Nov. 15, 2021

(86) PCT No.: PCT/US2021/059353
§ 371 (c)(1),
(2) Date: Mar. 16, 2023

(87) PCT Pub. No.: WO2022/104192
PCT Pub. Date: May 19, 2022

(65) Prior Publication Data
US 2023/0356871 A1    Nov. 9, 2023

Related U.S. Application Data

(60) Provisional application No. 63/113,343, filed on Nov. 13, 2020.

(51) Int. Cl.
*B65B 51/10*    (2006.01)
*B29C 65/00*    (2006.01)
(Continued)

(52) U.S. Cl.
CPC ............ *B65B 51/30* (2013.01); *B29C 65/224* (2013.01); *B29C 65/38* (2013.01);
(Continued)

(58) Field of Classification Search
CPC ..... B65B 9/087; B65B 59/003; B65B 39/145; B29C 66/112; B29C 66/83511;
(Continued)

(56) References Cited

U.S. PATENT DOCUMENTS 3,558,400 A * 1/1971 Horvath et al. .... B29C 66/4312
156/553
3,703,590 A * 11/1972 Holler et al. ........... B31B 70/00
156/360

(Continued)

FOREIGN PATENT DOCUMENTS

GB    1584776 A  *  2/1981  ............ B01F 9/0001

OTHER PUBLICATIONS

European Patent Office, International Search Report and Written Opinion of the International Searching Authority, International Application No. PCT/US2021/059353, mailed Feb. 23, 2022. (11 pages).

(Continued)

*Primary Examiner* — Andrew M Tecco
(74) *Attorney, Agent, or Firm* — Wood Herron & Evans LLP

(57) ABSTRACT

A pouch machine vertical sealer capable of fusing a pouch film web to form a plurality of spaced vertical seals along a length of the film web to form pouches. The pouch machine vertical sealer includes a sealer wheel rotatable about a vertical axis of rotation and defines a film web path about a periphery of the sealer wheel. The vertical sealer further includes a plurality of vertical sealer land assemblies spaced apart about the periphery of the sealer wheel. Each vertical sealer land assembly includes an impulse heater such that contact between the film web and each impulse heater of the plurality of vertical sealer land assemblies forms the spaced apart vertical seals along the length of the film web.

21 Claims, 25 Drawing Sheets

(51) Int. Cl.
    *B29C 65/18*     (2006.01)
    *B29C 65/22*     (2006.01)
    *B29C 65/38*     (2006.01)
    *B65B 9/087*     (2012.01)
    *B65B 51/16*     (2006.01)
    *B65B 51/30*     (2006.01)

(52) U.S. Cl.
    CPC .. *B29C 66/81821* (2013.01); *B29C 66/83513* (2013.01); *B29C 66/8511* (2013.01); *B29C 66/8744* (2013.01); *B29C 66/91421* (2013.01); *B65B 9/087* (2013.01); *B65B 51/16* (2013.01); *B65B 2051/105* (2013.01)

(58) Field of Classification Search
    CPC ... B29C 66/81821; B29C 65/18; B29C 65/38; B29C 65/7894
    See application file for complete search history.

(56) References Cited

U.S. PATENT DOCUMENTS

| | | | |
|---|---|---|---|
| 3,821,873 A * | 7/1974 | Benner, Jr. | B65B 9/087 53/562 |
| 4,959,044 A * | 9/1990 | Smith | B31B 70/024 493/194 |
| 5,502,951 A | 4/1996 | Oliverio et al. | |
| 6,058,818 A * | 5/2000 | Dieterlen | B26D 7/2628 83/482 |
| 6,657,165 B1 * | 12/2003 | Makutonin | B29C 66/91423 219/244 |
| 7,954,307 B2 * | 6/2011 | Paunesku | B65B 43/04 53/469 |
| 8,282,538 B2 * | 10/2012 | Paunesku | B65B 43/04 493/193 |
| 9,873,533 B2 * | 1/2018 | Paunesku | B65B 39/145 |
| 2004/0025476 A1 * | 2/2004 | Oliverio | B65B 9/087 53/550 |
| 2007/0180794 A1 * | 8/2007 | Paunesku | B65B 43/04 53/562 |

OTHER PUBLICATIONS

The International Bureau of WIPO, International Preliminary Report on Patentability, International Application No. PCT/US2021/059353, mailed May 25, 2023 (10 pages).

* cited by examiner

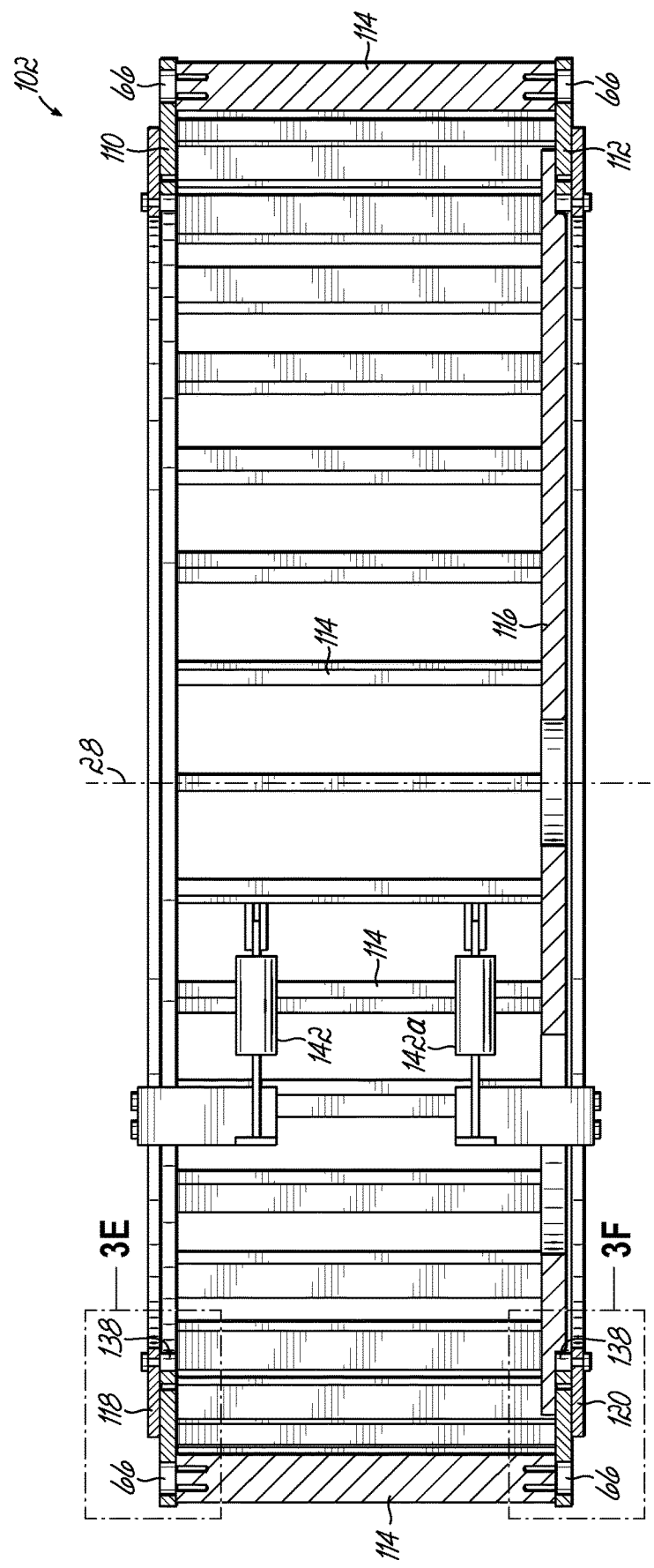

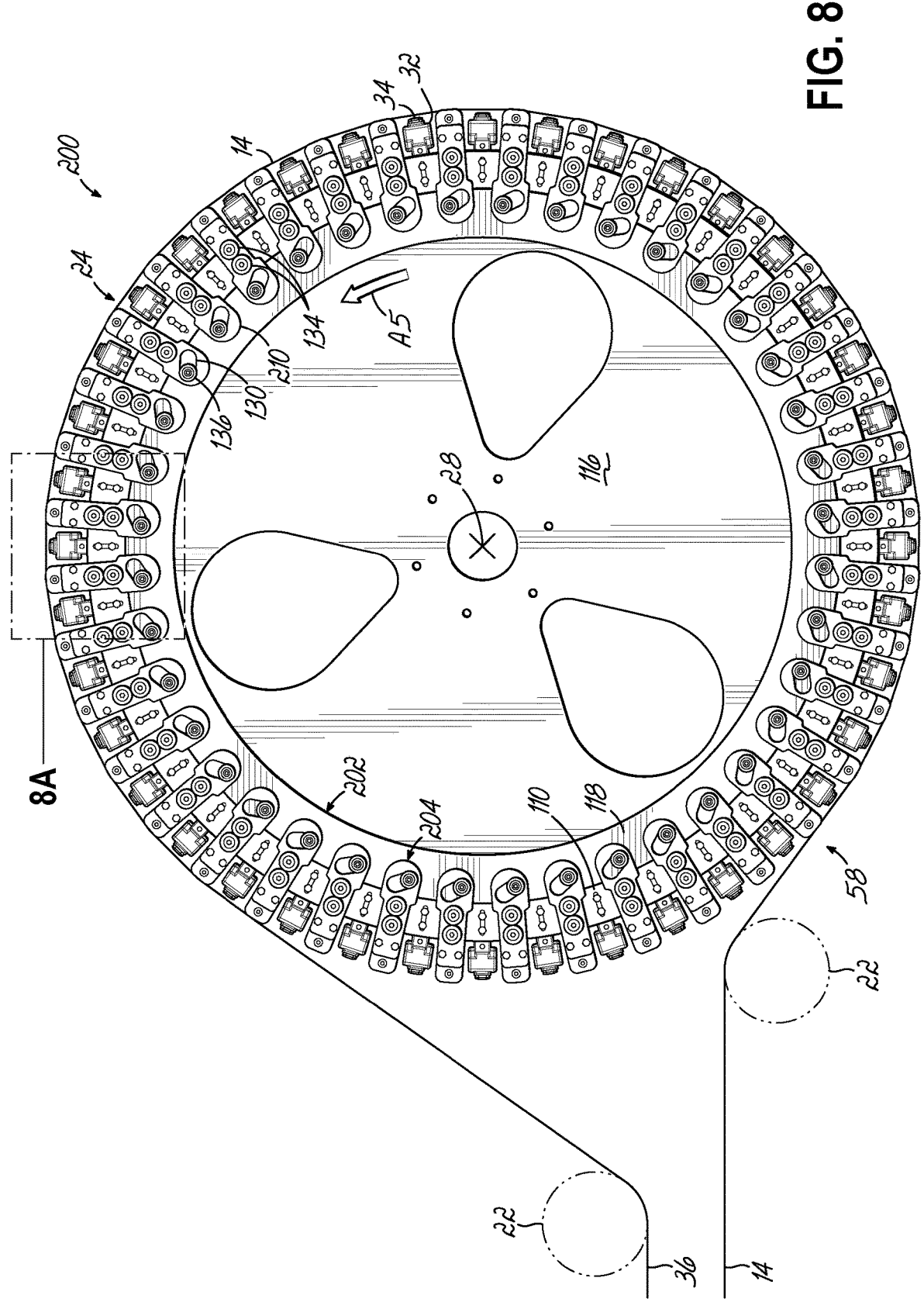

SUSTAINABLE FILM POUCH MACHINE

CROSS-REFERENCE TO RELATED APPLICATIONS

The present application is a submission under 35 U.S.C. § 371 of International Application No. PCT/US2021/059353, filed Nov. 15, 2021, which claims the filing benefit of U.S. Provisional Application Ser. No. 63/113,343, filed Nov. 13, 2020, the disclosures of which are incorporated herein by reference in their entireties.

TECHNICAL FIELD

This invention relates generally to apparatus and methods for forming packages such as pouches from web plies sealed vertically and, more particularly, to a vertical sealer to reduce web waste resulting from stop/start operations during production cycles.

BACKGROUND

In the packaging machine industry, it is a common practice to make pouch containers from reeled film stock as the web material for the pouch line. This is illustrated by various patents such as U.S. Pat. Nos. 3,821,873; 5,502,951; 8,282,538 B2; 6,657,165 B1; 7,954,307 B2 and 9,873,533 B2 all of which are expressly incorporated herein in their entireties. The need for improvements therein results from changing from non-sustainable to sustainable web film structures (sustainable films typically include layered monomer plastics arranged as single polymer films compatible with current recycling processes and bio/compostable plastics). Since the development of sustainable films is ongoing, the need to update the packaging machine process to use these films is increasingly critical. Generally, the current HFFS (horizontal-form-fill-seal) pouch machine of Applicant forms pouches from a roll of specially designed web material, fills them with product, seals them, and discharges them into a festoon accumulator for further processing.

Today, as well as in the past, this above-described process produces acceptable pouches when the machine is run at steady state. But inherently with this operation, stopping and restarting the line, particularly when running sustainable films, produces unusable pouches along the length of web encompassing or extending through the machine during the stop/restart event. The length of web most affected by the stop/restart event is that which is in contact with the vertical sealer. In this regard, web parameters of sustainable web films become increasing important due to the difficulty their properties present when compared to known non-sustainable web film layers (non-sustainable film layers are typically not mono-structures and have a variety of polymer layers mixed with paper, aluminum foil and metallized layers). The weaker hot tack properties of sustainable plastic films allow greater web elongation than non-sustainable films that contain paper or metal layers. Applicant has made past advancements to vertical sealers for pouch machines to improve heat control for non-sustainable films, such as described in at least U.S. Pat. No. 6,657,165 B1, the disclosure of which is expressly incorporated herein in its entirety. However, more precise heat control is required for sustainable films to mitigate their poor hot tack strength. Non-sustainable or conventional pouch films that contain paper and metal layers exhibit fewer problems regarding elongation control. This is due to the dimensional stability of their material properties at the vertical seal temperature.

Presently, excessive conduction of heat at the vertical web seals during stop and restart actions causes distortion of sustainable plastic vertical seals. Insufficient web tension control and poor heat control will aggravate the at temperature seal weakness in such films during stop and restart events. Sustainable film stretching as compared to that in non-sustainable films requires more exacting vertical seal heat. Examples of sustainable films include: AmPrima (commercially available from Amcor), 4Flex (commercially available from Layfield Flexible Films), and EcoLam (commercially available from Constantia Flexibles etc.). Current film materials are known as monomers and some are: PP—polypropylene PE—polyethylene, BOPE—biaxially oriented polyethylene BOPP—biaxially oriented polypropylene, and BOPET—biaxially oriented polyester, for example.

Several methods are known for film vertical sealing such as those disclosed in the patents incorporated herein above. One such method uses film heaters attached to thin plates, or lands, radially spaced about the circumference of a vertical sealing wheel. Through conduction, the film heaters bring the lands to a set temperature (e.g., 163° C.). The folded web is wrapped partially around the wheel (e.g., 270°) and in contact with a certain number of heated lands to weld the film layers at each plate edge. The vertical seal wheel diameter and the number of lands is determined by the pouch "cut-off", the required land contact time, and the desired line speed. When necessary to stop and restart the line, the temperature of these conventional lands remains substantial unchanged and cannot be cooled down quickly. For sustainable film structures, any prolonged amount of dwell time on the lands can cause heat damage rendering a section of the web unusable. In practice, any pouches formed during the start/stop event are considered waste since the vertical seal integrity is unknown.

In view of the above, it is desirable to have a sustainable film pouch machine capable of producing useable pouches with less vertical heat seal distortion and film elongation than presently attainable on current machines, particularly during stop, dwell, and startup sequences of a production cycle, to thereby eliminate or greatly reduce web waste.

SUMMARY

The present invention overcomes the foregoing and other shortcomings and drawbacks of pouch machine vertical sealers. While the present invention will be discussed in connection with certain embodiments, it will be understood that the present invention is not limited to the specific embodiments described herein.

According to one embodiment of the invention, a pouch machine vertical sealer capable of fusing a pouch film web to form a plurality of spaced vertical seals along a length of the film web is provided. The vertical sealer includes a sealer wheel rotatable about a vertical axis of rotation and which defines a film web path about a periphery of the sealer wheel. The vertical sealer includes a plurality of vertical sealer land assemblies spaced apart about the periphery of the sealer wheel and each comprising an impulse heater. Contact between the film web and the impulse heater of each of the plurality of vertical sealer land assemblies forms the spaced apart vertical seals along a length of the film web.

According to one aspect of the invention, each impulse heater is capable of heating up and cooling down. In another aspect, the plurality of vertical sealer land assemblies each include a cooling medium passageway for cooling of the respective vertical sealer land assembly and impulse heater.

In a further aspect, the cooling medium passageway extends through the vertical sealer land in a direction along a length of the respective impulse heater.

According to another aspect, the vertical sealer includes a plurality of rollers spaced apart about the periphery of the sealer wheel with at least one roller being located between each of the plurality vertical sealer land assemblies.

In yet another aspect, each of the plurality of vertical sealer land assemblies is supported about the sealer wheel by a land housing. The land housing is configured to radially move the respective vertical sealer land assembly between an operative position wherein the respective impulse heater of the vertical sealer land assembly is in contact with the film web and a retracted position wherein the respective impulse heater of the vertical sealer land assembly is spaced away from the film web in a radially inward direction toward the vertical axis of rotation of the sealer wheel. In a further aspect, the plurality of rollers support the film web when the plurality of vertical sealer land assemblies are in the retracted position. In yet another aspect, the plurality of rollers are radially fixed. According to another aspect, the sealer wheel includes actuatable upper and lower shifter rings to which each land housing is operatively coupled for radially moving each vertical sealer land between the operative position and the retracted position.

In one aspect, the upper and lower shifter rings each include cam rollers with one cam roller of the upper shifter ring in engagement with a cam drive slot in each land housing and one cam roller of the lower shifter ring in engagement with another cam drive slot in each land housing to radially move the plurality of vertical sealer lands. In a further aspect, the upper and lower shifter rings are each operatively coupled to the sealer wheel with an actuatable cylinder configured to rotate the upper and lower shifter rings about the vertical axis of rotation of the sealer wheel to radially move the plurality of vertical sealer lands.

According to another aspect, each of the plurality of rollers is supported from the sealer wheel by a roller housing configured to radially move the respective roller between an idle position wherein the respective roller is spaced away from the film web in a radially inward direction toward the vertical axis of rotation of the sealer wheel and an extended position wherein the respective roller is moved in a radially outward direction away from the vertical axis of rotation of the sealer wheel and in contact with the film web to support the film web away from the impulse heater of each of the plurality of vertical sealer land assemblies. In a further aspect, the plurality of vertical sealer land assemblies are radially fixed.

In another aspect, the sealer wheel further includes actuatable upper and lower shifter rings to which each roller housing is operatively coupled for radially moving each roller between the operative position and the extended position. In a further aspect, the upper and lower shifter rings each include cam rollers with one cam roller of the upper shifter ring in engagement with a cam drive slot in each roller housing and one cam roller of the lower shifter ring in engagement with a cam drive slot in each roller housing to radially move the plurality of rollers. In yet a further aspect, the upper and lower shifter rings are each operatively coupled to the sealer wheel with an actuatable cylinder configured to rotate the upper and lower shifter rings about the vertical axis of rotation of the sealer wheel to radially move the plurality of rollers.

According to one aspect, the sealer wheel includes a top slip ring and a bottom slip ring with one of either the top slip ring or bottom slip ring being configured to transmit data between the impulse heater of each of the plurality of vertical sealer land assemblies and a controller and the other one of the top slip ring or bottom slip ring being configured to transmit power to the at least one impulse heater of each of the plurality of vertical sealer lands.

According to one aspect of the invention, a method of fusing pouch film web to form a plurality of vertical seals along a length of the film web to form pouches is provided. The method includes providing a pouch machine vertical sealer having a sealer wheel rotatable about a vertical axis of rotation that defines a film web path about a periphery of the sealer wheel. The vertical sealer includes a plurality of vertical sealer land assemblies spaced apart about the periphery of the sealer wheel each of which include an impulse heater. The method includes rotating the vertical sealer to entrain the film web around the sealer wheel and engaging the film web with the impulse heater of the plurality of vertical sealer land assemblies and sealing the film web to form a vertical seal at the impulse heater of the plurality of vertical sealer land assemblies. The method further includes reciprocating one of the plurality of vertical sealer land assemblies or the plurality of rollers radially outwardly and inwardly with respect to the other one of the plurality of vertical sealer land assemblies or the plurality of rollers to selectively create a space between the film web and the impulse heater of the plurality of vertical sealer land assemblies.

According to one aspect, the plurality of vertical sealer land assemblies each include a cooling medium passageway for cooling of the respective impulse heater, and the method further includes selectively cooling each vertical sealer land assembly to limit heating of the web by the respective impulse heater.

According to another embodiment of the invention, a vertical sealer land assembly for use in a pouch machine vertical sealer and capable of fusing a pouch film web is provided. The vertical sealer land assembly includes an impulse heater located on the vertical sealer land assembly for generating heat to thermally seal the film web in contact with the impulse heater to form a vertical seal. The vertical sealer land assembly also includes a cooling medium passageway that extends through the vertical sealer land assembly for cooling of the impulse heater.

According to one aspect, the cooling medium passageway extends through the vertical sealer land assembly in a direction along a length of the impulse heater. In another aspect, the impulse heater is located between an insulation material on the vertical sealer land assembly and a protective cover for contacting the film web.

Various additional features and advantages of the invention will become more apparent to those of ordinary skill in the art upon review of the following detailed description of one or more illustrative embodiments taken in conjunction with the accompanying drawings.

BRIEF DESCRIPTION OF THE DRAWINGS

The accompanying drawings, which are incorporated in and constitute a part of this specification, illustrate one or more embodiments of the invention and, together with the general description given above and the detailed description given below, serve to explain the one or more embodiments of the invention.

FIG. 3D is a cross-sectional view of the pouch machine vertical sealer shown in FIG. 3C, illustrating shifter ring air cylinder assemblies.

FIG. 8 is a top view of the pouch machine vertical sealer wheel of FIG. 3, illustrating the movable rollers in an extended position.

DETAILED DESCRIPTION

Aspects of the present invention are directed to a pouch machine vertical sealer and process for forming spaced apart vertical thermal seals along a moving or intermittently stopped film web by contact of the film web with heated vertical sealer land assemblies located about the pouch machine vertical sealer. In this regard, embodiments of the pouch machine vertical sealer are for use in machinery for making thermally sealed pouch-type bags from a continuous web of material, otherwise referred to as a pouch machine. More particularly, embodiments of the pouch machine vertical sealer are particularly suitable for thermally sealing film web formed from sustainable or recyclable film structures.

As will be described in further detail below, in one embodiment, the pouch machine vertical sealer is configured to mechanically achieve rapid separation between the film web and the lands of the vertical sealer land assemblies in contact with the film web to prevent over heating of the film web, particularly at times when the film web is intermittently stopped on the pouch machine vertical sealer. In another embodiment, the plurality of vertical sealer land assemblies each include a land comprising an impulse heater capable of rapid heat up and cool down to thermally seal the film web in contact with the vertical sealer lands in a controlled manner. Each of these aspects improves the functionality and operation of the pouch machine vertical sealer to reduce heat distortion and film elongation caused from prolonged contact between the vertical sealer lands and the film web, particularly during stop, dwell, and startup sequences of a pouch machine production cycle, and each will be described in additional detail below.

Figure 1:
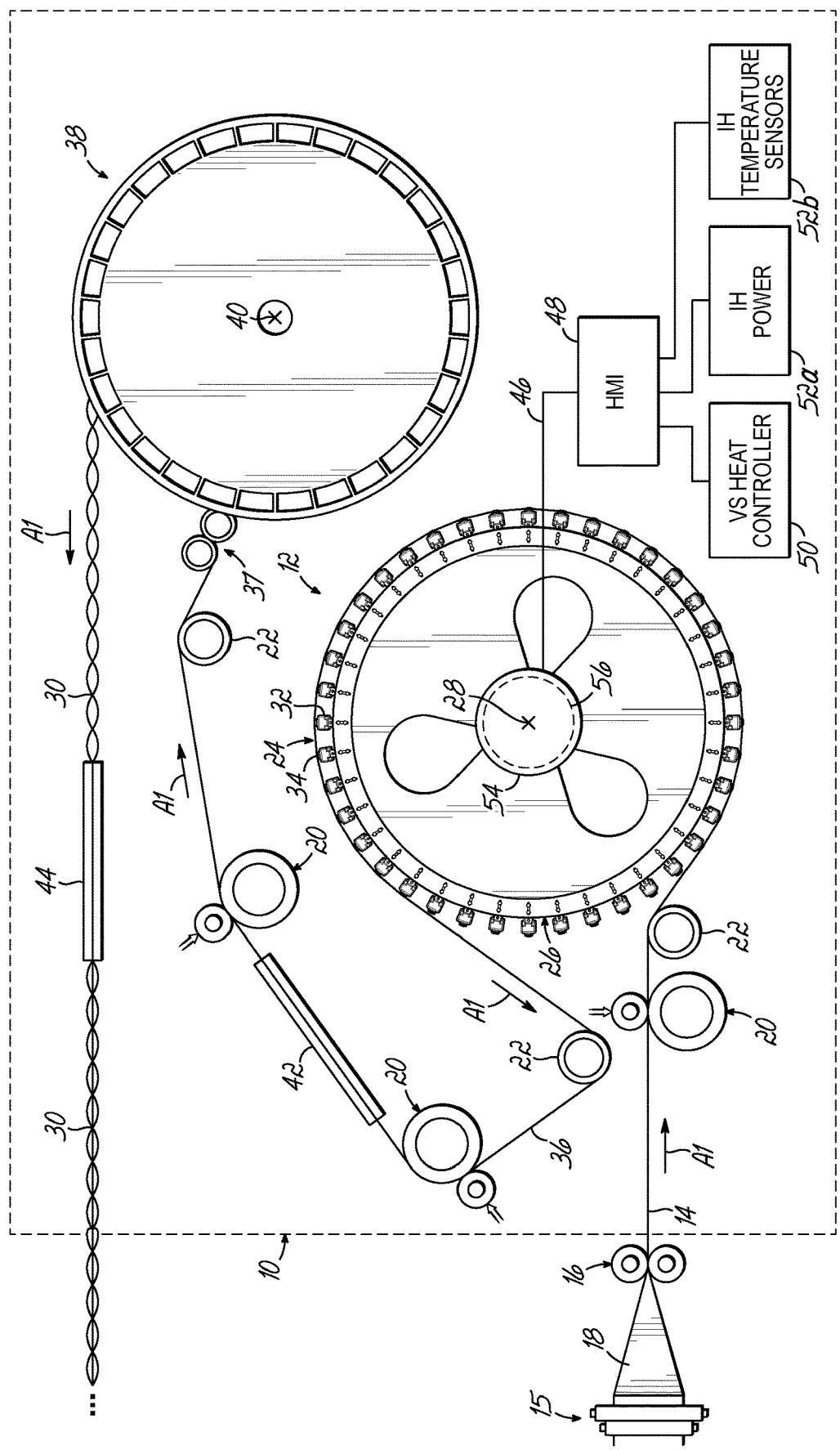
FIG. 1 is a diagrammatic view of a pouch machine for filling and sealing pouches having a pouch machine vertical sealer wheel according to one embodiment of the invention.

Referring now to the figures, FIG. 1 illustrates an exemplary pouch machine 10 in which a vertical sealer 12 according to embodiments of the invention has particular utility. As shown, a flat film web 14 is unwound from a web roll (not shown) and continuously conveyed by servo driven registration rollers 15 over a folding plow 18 which folds the web 14 in half, with the edges of the film web 14 facing up and the fold facing down. In this regard, the fold forms the bottom of the pouches. As indicated by directional arrows A1, the film web 14 is conveyed from the folding plow 18 to the vertical sealer 12 through centering rollers 16 and one or more other rollers, such as idler rollers 20 and a tension monitoring roller 22, if used. The tension monitoring roller(s) 22 may be used to monitor a tension of the film web 14. The film web 14 is entrained around a periphery 24 of a sealer wheel 26 of the vertical sealer 12, and may be entrained around 270°, or more, about the periphery 24 of the sealer wheel 26, for example. However, the film web 14 may be entrained within a range of between 90° to 300° about the periphery of the sealer wheel 26. The sealer wheel 26 is rotatable about an axis of rotation 28 to convey the film web 14 while simultaneously forming vertical seals 30 along the film web 14. In this regard, the vertical sealer 12 includes a plurality of vertical sealer land assemblies 32 spaced equally apart about the periphery 24 of the sealer wheel 26. Each vertical sealer land assembly includes a vertical sealer land 34 configured to contact the film web 14 to form the parallel spaced apart vertical seals 30 along the film web 14. As shown, the vertical sealer 12 includes a total of 40 vertical sealer land assemblies 32 spaced about the sealer wheel 26. However, it is understood that the vertical sealer 12 may include fewer or more vertical sealer land assemblies 32 as desired. In one embodiment, the vertical sealer 12 may include 32 vertical sealer land assemblies 32, for example.

The vertical seals 30 are formed as a result of the contact between the film web 14 and the vertical sealer lands 34 which are each defined by an impulse heater according to embodiments of the invention. The vertical sealer land 34 generates heat to fuse the folded film web 14 together to form the vertical seals 30 at locations along the film web 14 which are in contact with the vertical sealer land assemblies 32. The contact time between the film web 14 and the vertical sealer land 34, a temperature of the vertical sealer lands 34, and pressure generated by tension on the film web 14 by the pouch machine 10, are all factors that influence forming of the vertical seals 30. The film web 14 coming off the vertical sealer 12 includes parallel spaced apart vertical seals 30. While the pouches may not be opened at this point, each pouch has been formed except for the closure of the top and reinforcement sealing of the bottom edge, if desired. To this end, the film web 14 leaving the vertical sealer 12 comprises a series of connected, open-top pouches in a pouch train 36.

With continued reference to FIG. 1, the pouch train 36 is fed to pouch opening rollers 37, known as tucking rollers, and then to a pouch filling station 38 at which a metered quantity of substance, such as powered food, is placed inside the individual pouches located along the pouch train 36. The filling station 38 is rotatable about an axis of rotation 40 such that the pouches at the pouch filling station 38 rotate around the periphery thereof as the filling station 38 rotates. Between the vertical sealer 12 and the pouch filling station 38, the web 14 path may include one or more idler and/or tension rollers 20, 22 and the pouch train 36 may be conveyed through a bottom sealer 42. The bottom sealer 42 is used to seal each pouch of the pouch train 36 along the web fold, or bottom edge of the pouch, and may comprise a pair of cartridge heaters placed in cast iron assembly, for example. After filling with the metered quantity of substance, the pouches are conveyed to a top sealer 44 which generates heat to thermally seal shut the open top of each pouch to close the food stuff or other material therein in a sanitary manner. Finally, the pouch train 36 of sealed pouches, which are still part of the continuous film web 14, pass to a cutting station (not shown) at which a series of rotating knives cut the individual pouches apart along the spaced apart vertical seals 30 which were formed by the vertical sealer 12. If desired, the pouch train 36 may be accumulated before reaching the cutting station.

The exemplary pouch machine 10 may be a Pouch King® pouch machine, commercially available from the Assignee of the present disclosure, and capable of operating rates of up to 2000 pouches per minute (ppm), for example. However, while embodiments of the pouch machine vertical sealer 12 are shown and described in the context of the exemplary pouch machine 10, it will be understood that the same inventive concepts related to embodiments of the vertical sealer 12 may be implemented with different machinery for making thermally sealed pouch-type bags from a web of material without departing from the scope of the invention. More particularly, in its broader aspects, the inventive concepts related to the vertical sealer land assemblies 32 and vertical sealer lands 34 of the vertical sealer 12 may be implemented in any application that requires thermal sealing of sustainable and non-sustainable material such as polypropylene, polyethylene, biaxially oriented polyethylene, biaxially oriented polypropylene, biaxially oriented polyester, or other similar monomers, or film structures containing layers (e.g., plies) of paper, aluminum foil, cellophane foil, metallized structures, and/or laminates, for example. To this end, the drawings are not intended to be limiting.

The pouch machine 10 includes a Human Machine Interface (HMI) 48 and one or more controllers configured to control heat sealing parameters of the vertical sealer 12, shown schematically in FIG. 1. In this regard, the pouch machine 10 includes at least a vertical seal heat controller 50 for controlling vertical seal heat at the vertical sealer land assemblies 32 (e.g., power delivery to the lands 32) and one or more impulse heater electrics and control controllers 52a, 52b for transmitting data in the form of electrical signals to or from the vertical sealer land assemblies 32, and more particularly the impulse heaters 34. The HMI 48, vertical seal heat controller 50, and the one or more impulse heater electrics and control controllers 52a, 52b are operatively coupled to the vertical sealer 12, via appropriate wiring 46, to allow a machine operator to interact with and control certain parameters of the vertical sealer 12, such as setting or monitoring a temperature of each vertical sealing land 34, or a grouping of vertical sealing lands 34, for example. The vertical sealer 12 may include at least one, and preferably two slip rings configured to operatively couple the vertical sealer 12 to the HMI 48 and controllers 50, 52a, 52b. In this regard, the sealer wheel 26 may include an upper slip ring 54 and a lower slip ring 56. The lower slip ring 56 may be used to couple the vertical sealer lands 34 to the vertical seal heat controller 50 and Impulse Heat (IH) power controller 52a, and the upper slip ring 54 may be used to couple the vertical sealer land assemblies 32 to the one or more impulse heater (IH) temperature sensor and control controllers 52b, for example. One or both slip rings 54, 56 may be configured to deliver cooling medium from an external source to the vertical sealer land assemblies 32 to cool the assemblies 32 and vertical sealer lands 34, as described in further detail below. As should be understood by a person of ordinary skill in the art, the slip rings 54, 56 are an electromechanical coupling that allows the transmission of power and electrical signals from a stationary to a rotating structure. To this end, the slip rings may be similar to the XA series of slip rings commercially available from Conductix-Wamfler GmbH (Märkt, Germany).

As illustrated in FIG. 1, during normal operation, the continuous film web 14 is conveyed onto the sealer wheel 26 and into contact the individual vertical sealer lands 34. The vertical seals 30 are formed by the vertical sealer lands 34 while the film web 14 remains engaged with the periphery 24 of the sealer wheel 26 as the film web 14 is conveyed about the sealer wheel 26. The continuous film web 14, which may be referred to as a bandelier, may be coated with a thermoplastic material to facilitate sealing and may be a single web folded in half as described above. However, the film web 14 may comprise at least two separate webs fused together at the vertical seals 30. In either case, the vertical sealer land assemblies 32 and associated lands 34 are outwardly facing and have precisely chosen spacings therebetween so that each vertical sealer land 34 contacts the continuous film web 14 at the bandelier registration marks which are spaced equally along the film web 14 as the film web 14 moves around the periphery 24 of the sealer wheel 26. The registration marks may also be referred to as eye marks by those versed in the art. Because of the relatively high speed rotation of the vertical sealer 26 and the film web 14 about the sealing wheel 26 during normal operation of the pouch machine 10, there is a controlled contact time between the film web 14 and each vertical sealer land 34 which produces robust vertical seals 30 having uniformity in seal width.

However, if, for any reason the continuous movement of the film web 14 through the pouch machine 10 has to be stopped, or the throughput speed of the film web 14 slowed, resulting in a longer contact time between the film web 14 and the vertical sealer lands 34, the resultant effect is a deformed vertical seal. This is particularly true for vertical sealers 12 equipped with conventional lands having film heaters which have poor heat control and cannot be cooled quickly. Generally, most deformed seals are misshapen and wider at a midpoint of the vertical seal. The wider vertical seals produced as a result of the longer contact time create individual pouches having an hour glass type interior shape which reduces the capacity of the pouch to be filled. Sustainable plastic films which have weaker hot tack properties are particularly susceptible to overheating as a result of prolonged contact with the vertical sealer lands 34. In this regard, sustainable plastic film webs may experience substantial weakening, stretching, and even partial or complete separation of the film web 14 at the deformed vertical seal 30, each of which is undesirable and can cause downtime to correct as well as issues in downstream operations. The embodiments of the vertical sealer land assemblies 32 and associated lands 34 for use with the vertical sealer 12 disclosed herein are capable of exacting heat control (e.g., rapid heat up and cool down) and/or rapid separation between the film web 14 and the vertical sealer lands 34 to minimize or prevent overheating of a stopped film web 14 at the vertical sealer lands 34. Other advantages and effects of the embodiments of this invention will be evident from the following description.

Figure 2:
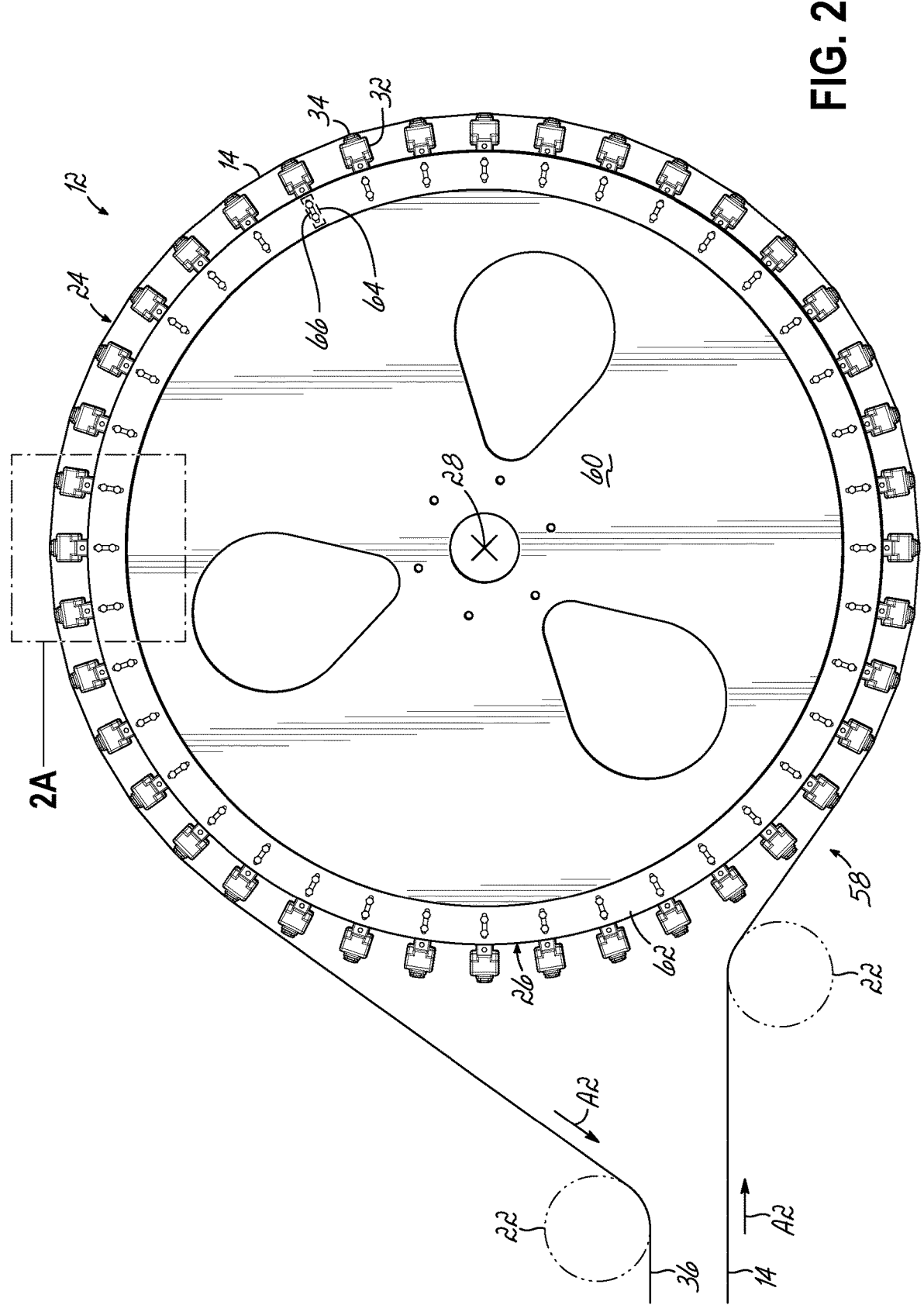
FIG. 2 is top view of the pouch machine vertical sealer wheel of FIG. 1.
Figure 2A:
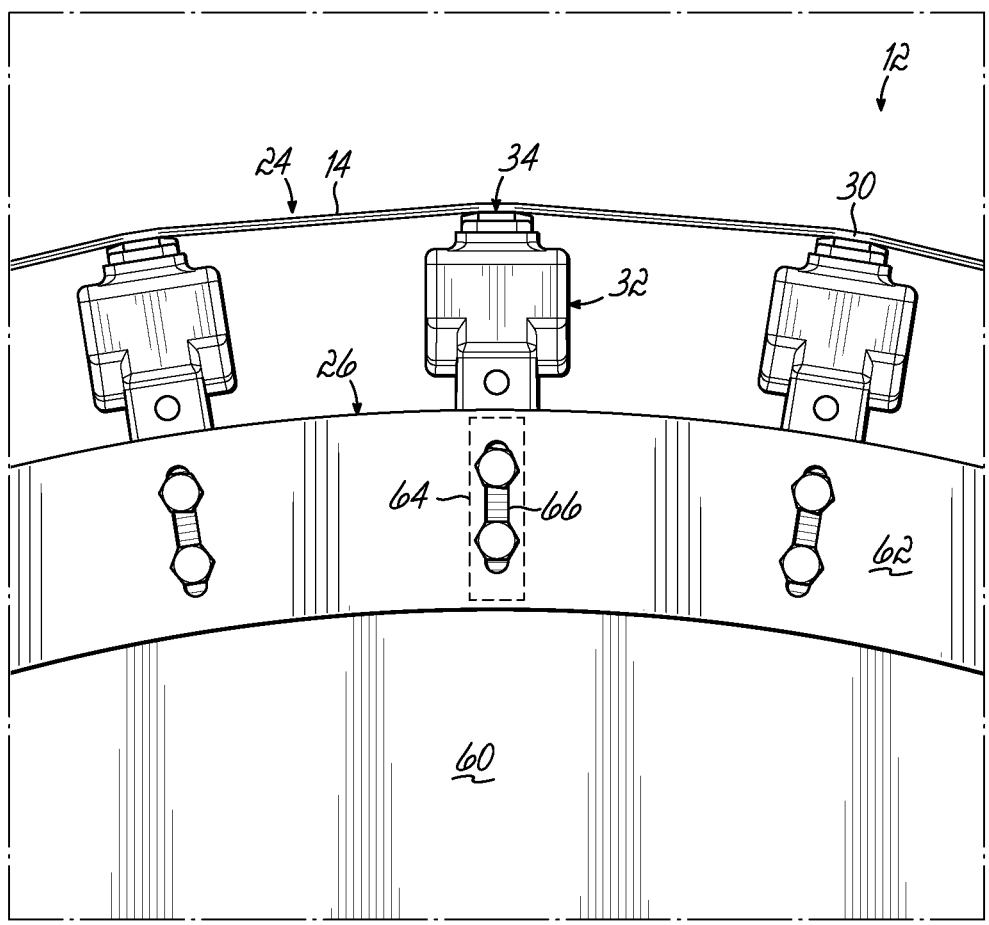
FIG. 2A is an enlarged view of area 2A of FIG. 1, illustrating contact between a film web and vertical sealer lands of the vertical sealer wheel.

With reference to FIGS. 1-2A, a first embodiment of the pouch machine vertical sealer 12 is shown. The vertical sealer 12 includes the sealer wheel 26 which is rotatable about the axis of rotation 28. In this regard, the sealer wheel 26 defines a film web path 58 about the periphery 24 of the sealer wheel 26. Thus, as the sealer wheel 26 rotates, the film web 14 is received onto the sealer wheel 26 and into contact the vertical sealer lands 34. The vertical seals 30 are formed in the film web 14 while the film web 14 resides in the film web path 58 and is carried a distance about the sealer wheel 26 at which point the film web 14 is carried away from the sealer wheel 26 having spaced apart vertical seals 30 formed therein (e.g., FIG. 1). The direction of travel of the film web 14 in this regard is indicated by directional arrows A2 in FIG. 2.

The sealer wheel 26 includes a circular base plate 60 and an upper annular plate 62 to which the plurality of vertical sealer land assemblies 32 are attached. More particularly, each vertical sealer land assembly 32 is supported about the periphery 24 of the sealer wheel 26 with a support plate 64. In the exemplary embodiment, the support plate 64 is coupled between the upper annular plate 62 and the base plate 60 and may be displaced radially (e.g., in a distance toward or away from the axis of rotation 28 of the sealer wheel 26) along radial slots 66 in the upper annular plate 62 and base plate 60 to provide adjustment of spacing between the vertical seals 30 formed in the film web 14 by the plurality of vertical sealer land assemblies 32. However, the vertical sealer land assemblies 32 are radially fixed during operation of the vertical sealer 12. Each vertical sealer land assembly 32 is coupled to an outwardly facing surface of the support plate 64 to place the vertical sealer land 34 of the vertical sealer land assembly 32 in a position to contact with the film web 14, as shown in FIG. 2A. As will be described in further detail below, the vertical sealer land 34 is configured to fuse the film web 14 together to form the vertical seals 30 therein. In this embodiment, the vertical sealer land assemblies 32 may define the periphery 24 of the vertical sealer wheel 26 and thus the film web path 58.

FIG. 2A illustrates the film web 14 in contact with the vertical sealer lands 34 of a select few vertical sealer land assemblies 32 as the film web 14 is moved about the sealer wheel 26. In this regard, the tension of the film web 14 created by the pouch machine 10 maintains contact between the film web 14 and each vertical sealer land 32 as the sealer wheel 26 rotates. Thus, as the sealer wheel rotates 26, the time that the film web 14 is in contact with the vertical sealer lands 34 and the tension of the film web 14 about the sealer wheel 26 operate to form the vertical seals 30 in the film web 14 at each vertical sealer land 34. The pouch machine vertical sealer 12 may be operated in a vertical mode, as shown, or in a horizontal mode without departing from the invention. As described in further detail below, should rotation of the sealer wheel 26 be slowed or stopped such that the film web 14 remains in contact with the vertical sealer lands 34, the vertical sealer land assemblies 32 and lands 34 are capable of rapid cool down to prevent over heating of the film web 14 at each vertical sealer land 34 to thereby prevent deformed vertical seals 30.

Figure 2B:
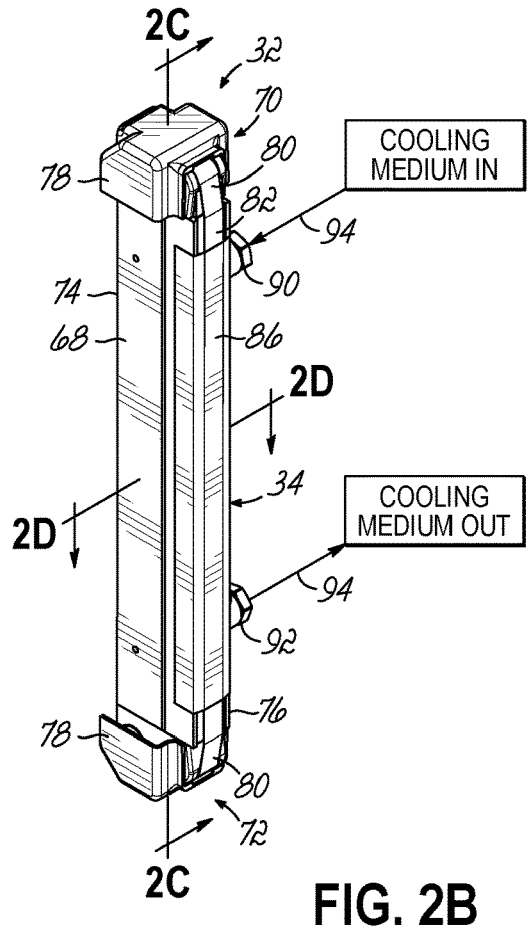
FIG. 2B is a perspective view of one vertical sealer land assembly according to one embodiment of the invention.
Figure 2D:
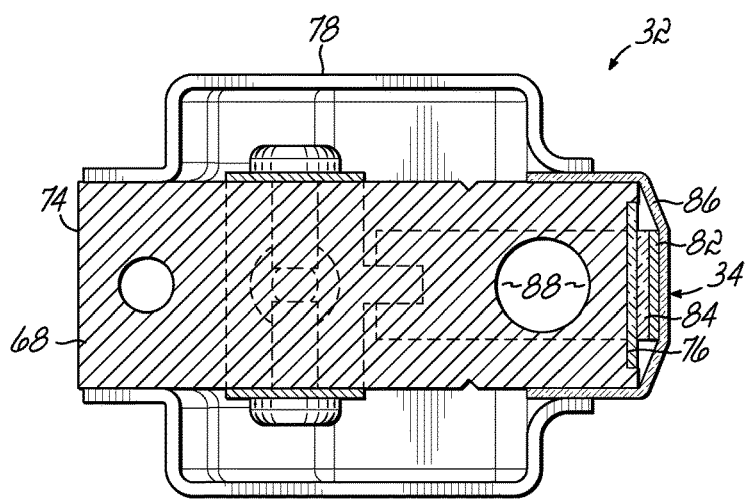
FIGS. 2C and 2D are a cross-sectional views of the vertical sealer land assembly of FIG. 2B, illustrating a cooling medium passageway and impulse heater of the vertical sealer land assembly.
Figure 2C:
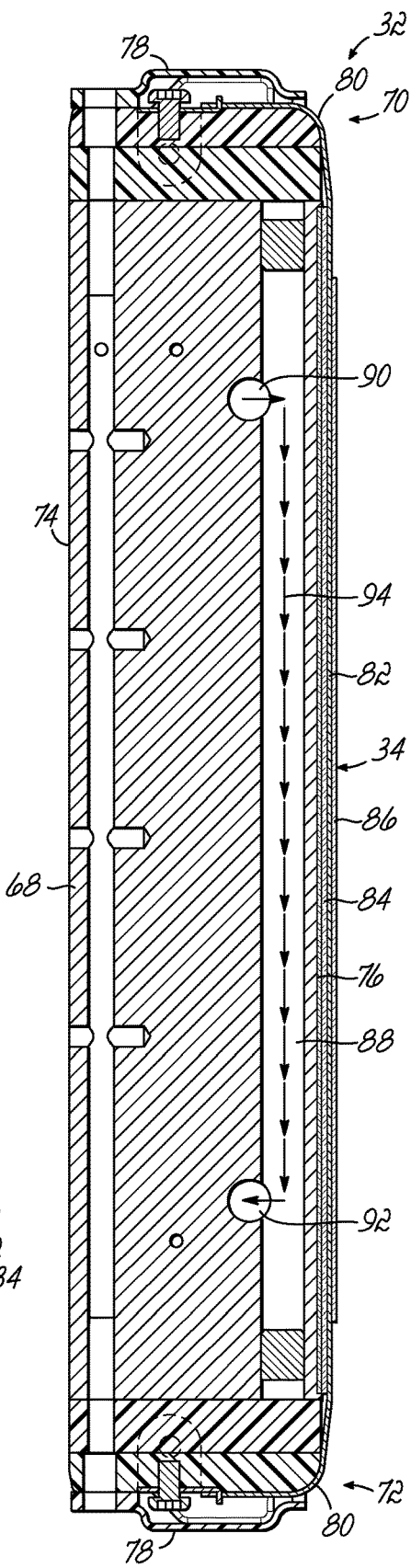

FIGS. 2B-2D illustrate details of the vertical sealer land assemblies 32. In this regard, each vertical sealer land assembly 32 includes an elongate body 68 that extends between a first end 70 and an opposite second end 72. The vertical sealer land 32 includes a base 74 configured to be coupled to the support plate 64 and an outwardly facing front 76 on which the vertical sealer land 34 is positioned. In the embodiment shown, the vertical sealer land 34 is an impulse heater which extends along the front 76 of the vertical sealer land assembly 32 and between connectors 78 located at the first and second end 70, 72 of the body 68 of the vertical sealer land assembly 32. In this regard, the connectors 78 are configured to receive terminal ends 80 of the impulse heater land 34 to both mechanically couple the impulse heater land 34 to the vertical sealer land assembly 32 and electrically couple the impulse heater land 34 to the controllers 50, 52a, 52b.

As shown, the impulse heater land 34 includes a ribbon-like layer of conductive material 82 such as glass ceramic, copper, or other conductive material capable of rapid heat up when an electric current flows therethrough and rapid cool down when no electric current is applied. The ability to rapidly heat up and cool down is due to the very low thermal mass of the ribbon-like layer of material 82. The ribbon of material 82 is positioned between a layer of insulation 84, or insulation pad, located on the front surface 76 of the body 68 of the vertical sealer land assembly 32 and a cover 86. The layer of insulation 84 separates the body 68 of the vertical sealer land assembly 32 from the heated ribbon of material 82 to minimize heat absorption and retention by the body 68. The insulation material 84 may be fiberglass, polystyrene, cellulose, polyurethane foam, mineral wool, or any other suitable material capable of reducing heat transfer, for example. The cover 86 prevents direct contact between the heated ribbon of material 82 and the film web 14, and may be a polytetrafluoroethylene (PTFE) impregnated tape, for example. To this end, the impulse heater which forms the vertical sealer land 34 may be similar to the TOSS® Heat Seal Jaw Bar, commercially available from TOSS® Machine Components, Inc. (Nazareth, Pennsylvania), or the heat sealing bar with a heat sealing band commercially available from ROPEX® GmbH (Bietigheim-Bissingen, Germany). Each of these companies offer impulse heater technology for various unrelated applications.

In another embodiment, the vertical sealer land 34 may comprise an impulse heater with a substrate having circuits printed thereon, or pixels, rather than the ribbon-like layer of material 82. The circuits are capable of rapid heat up when an electric current flows therethrough and rapid cool down when no electric current is applied. More particularly, the individual circuits of the vertical sealer land 34 of this embodiment permit targeted control of temperature along a length of the vertical sealer land 34. Thus, temperatures may be varied or the same along the length of the vertical sealer land 34 for sealing of the film web 14. To this end, the vertical sealer land 34 of this embodiment may be similar to the cera2seal heat-seal bar, commercially available from watttron GmbH (Freital, Germany), for example.

With continued reference to FIGS. 2C-2D, each vertical sealer land assembly 32 may also include a cooling medium passageway 88 for cooling of the respective vertical sealer land assembly 32 and the associated vertical sealer land 34. The body 68 of the vertical sealer land assembly 32 includes an inlet port 90 and an outlet port 92 for recirculating a cooling medium 94 through the fluid passageway 88. The cooling medium 94 may fluid or air, for example. The inlet port 90 is located at the first end 70 of the vertical sealer land assembly 32 and the outlet port is located at the second end 72 of the vertical sealer land assembly 32 such that the cooling medium passageway 88 extends through a length of the body 68 of the vertical sealer land assembly 32 in a direction along the vertical sealer land 34. Thus, the cooling medium passageway 88 is configured to cool the body 68 of the vertical sealer land assembly 32 and the vertical sealer land 34. This can further reduce the cool down time for each vertical sealer land 34. When considering the contact time between each vertical sealer land 34 and the film web 14 on the rapidly spinning vertical sealer wheel 26, vertical sealer lands 34 with assisted cooling can provide effective cycle times for welding sustainable films 14. That is, the vertical sealer lands 34 are both capable of rapidly heating up to operating temperature (e.g., heating up to a temperature within a range of between 100° C. to 200° C. in a time of between 0.05 seconds to 0.45 seconds, and rapidly cooling down to a temperature within a range of between 60 to 90° C. in a time of between 0.2 seconds to 10 seconds, for example.

During normal operation of the vertical sealer 12, the continuous film web 14 is in contact with a number of the vertical sealer lands 34 as it is conveyed rapidly about the sealer wheel 26 to form the vertical seals 30, as described above. However, at a time of stopping of the sealer wheel 26 and the other processes in the pouch machine 10, for any reason, the continuous dwell of the film web 14 on the vertical sealer lands 34 will not result in deformed vertical seals by nature of the vertical sealer lands 34 being able to cool down rapidly. In this regard, at stopping of the sealer wheel 26, the electrical potential produced by the vertical seal heat controller 50 is disconnected from the vertical sealer lands 34 which results in a rapid uniform cool-down across the longitudinal length of the vertical sealer lands 34. Also at stopping, the cooling medium 94 may be circulated through the cooling medium passageway 88 of each vertical sealer land assembly 32 to improve cool-down of the vertical sealer lands 34. To this end stop/dwell/restart functionality of the vertical sealer 12, particularly with sustainable films but also with non-sustainable films as well, is improved and burn-through or deformed vertical seals is avoided.

With reference to FIGS. 3-5A, wherein like reference numerals represent like features, details of an exemplary pouch machine vertical sealer 100 are shown in accordance with another embodiment of the present invention. The pouch machine vertical sealer 100 may be used with the pouch machine 10 described above. The primary differences between the vertical sealer 100 of this embodiment and the vertical sealer 12 of the previously described embodiment is that a sealer wheel 102 of the vertical sealer 100 includes a plurality of rollers 104 in addition to a plurality of vertical sealer land assemblies 32. The rollers 104 are spaced apart about a periphery 106 of the sealer wheel 102 with at least one roller 104 being located between each of the plurality of vertical sealer land assemblies 32. Furthermore, the vertical sealer land assemblies 32 are movably coupled to the sealer wheel 102 with a land housing 108 and movable with shifter rings for radially retracting the vertical sealer land assemblies 32, in a radially inward direction relative to the sealer wheel 102, to achieve rapid separation between the film web 14 and the vertical sealer lands 34 in contact with the film web 14 to prevent over heating of the film web 14 during stop/dwell/restart operations of the vertical sealer 100.

As shown, the sealer wheel 102 includes upper and lower annular plates 110, 112 spaced apart and coupled together by a plurality of webs 114. The sealer wheel 102 is generally cylindrical in shape and includes a circular base plate 116 coupled to the lower annular plate 112. The sealer wheel 102 includes a plurality of vertical sealer land assemblies 32 which are movably attached to the sealer wheel 102 with a respective land housing 108. The land housing 108 is for radially moving the respective vertical sealer land assembly 32 between an operative position, in which the associated vertical sealer land 34 is in contact with the film web 14, and a retracted position, in which the vertical sealer land 34 is spaced away from the film web 14 in a radially inward direction toward the vertical axis of rotation 28 of the sealer wheel 102. As described in further detail below, movement of the land housings 108 is caused by actuation of upper and lower shifter rings 118, 120 to which the land housings 108 are operatively coupled. The sealer wheel 102 further includes the plurality of rollers 104 which are spaced apart about the periphery 106 of the sealer wheel 102. More particularly, one roller 104 is located between each of the plurality of vertical sealer land assemblies 32. In the embodiment shown, each roller 104 extends vertically between upper and lower plates 110, 112 such that an axis of rotation of each roller is parallel with the axis of rotation 28 of the sealer wheel 102. As shown, the vertical sealer 100 includes a total of 40 vertical sealer land assemblies 32 and 40 rollers 104. However, it is understood that the vertical sealer 100 may include fewer or more vertical sealer land assemblies 32 and rollers 104 as desired. In one embodiment, the vertical sealer 100 may include 32 vertical sealer land assemblies 32 and 32 rollers 104, for example.

Figure 3:
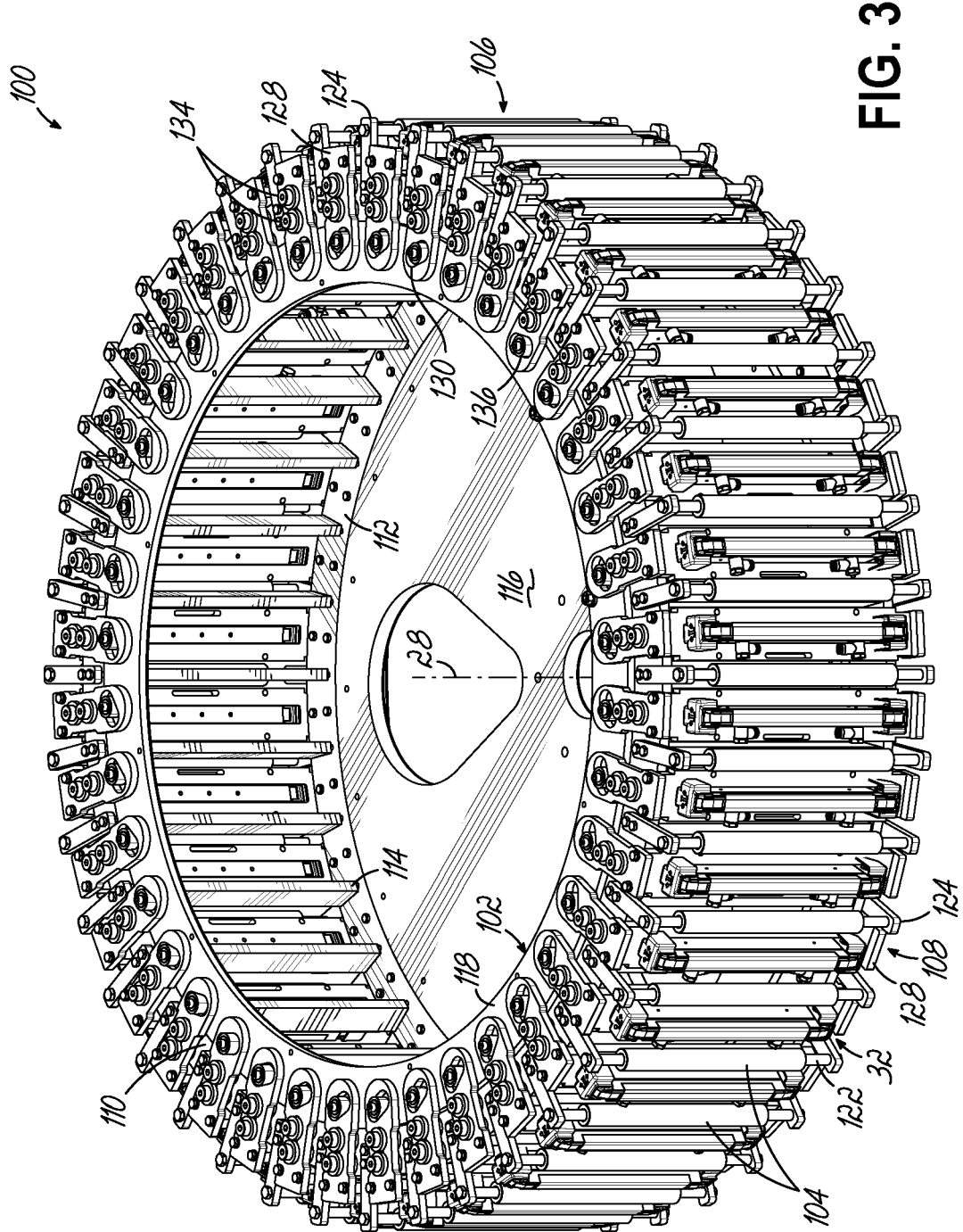
FIG. 3 is a perspective view of a pouch machine vertical sealer wheel having movable vertical sealer land assemblies in accordance with another embodiment of the invention.
Figure 3B:
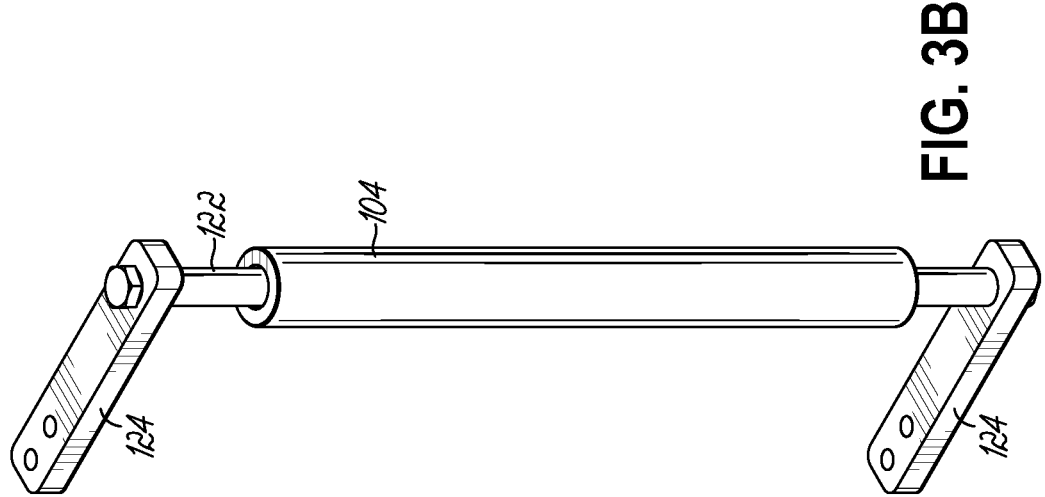
FIG. 3B is a perspective view of one stationary roller of FIG. 3.

As shown in FIGS. 3 and 3B, each roller 104 is rotatable about an axle 122 that is coupled between a pair of support arms 124. One support arm 124 is attached to the upper annular plate 110 and the other support arm 124 is attached to the lower annular plate 112 to support the roller 104 about the periphery 110 of the vertical sealer wheel 100. To this end, each roller 104 may have a length that extends substantially along the respective axle 118 and between the upper and lower annular plates 110, 112.

Figure 3A:
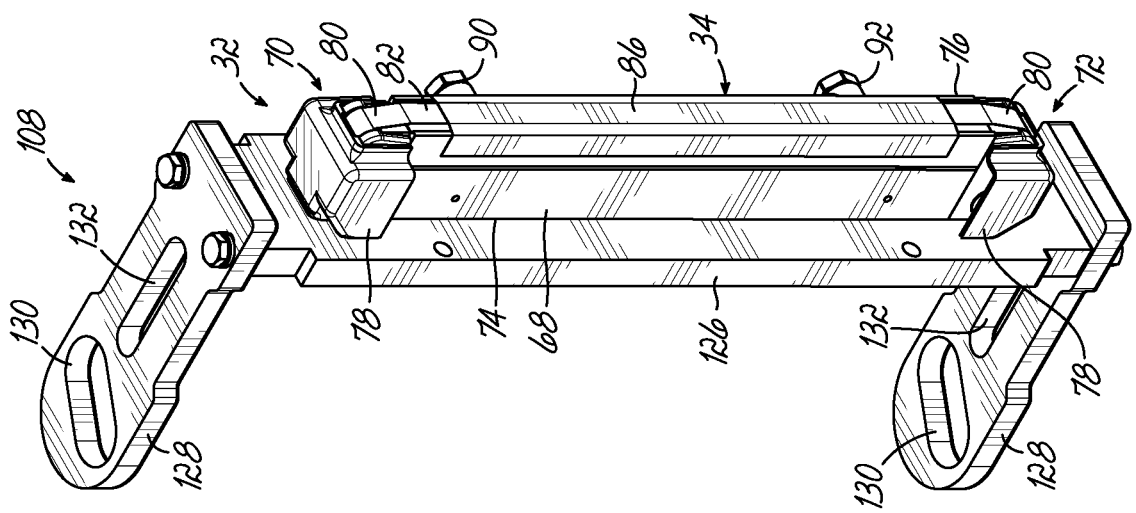
FIG. 3A is a perspective view of one movable vertical sealer land assembly of FIG. 3.

With reference to FIGS. 3 and 3A, each land housing 108 includes a plate-like support member 126 coupled between a pair of brackets 128. The support member 126 has an outwardly facing surface configured to receive a respective vertical sealer land assembly 32 thereon to place the vertical sealer land 34 in a position to contact with the film web 14. Each bracket 128 is configured to operatively couple the land housing 108 to the sealer wheel 102 of the vertical sealer 100 and includes a cam drive slot 130 and a radial drive slot 132. The cam drive slots 130 are oblong in shape and formed in the bracket 128 at an angle. As shown in FIG. 3, one bracket 128 is operatively coupled to both the upper annular plate 110 and upper shifter ring 118 with two slideable fasteners 134 positioned through the radial drive slot 128 (see also FIG. 4A). The cam drive slot 130 of the bracket is engaged with a corresponding cam roller 136 on the upper shifter ring 118 used to radially move the land housing 108, as will be described in further detail below. Similarly, the other bracket 128 is operatively coupled to both the lower annular plate 112 and lower shifter ring 120 with two slideable fasteners 134 positioned through the radial drive slot 128. The cam drive slot 130 of the bracket 128 is engaged with a corresponding cam roller 136 on the lower shifter ring 120.

Figure 3C:
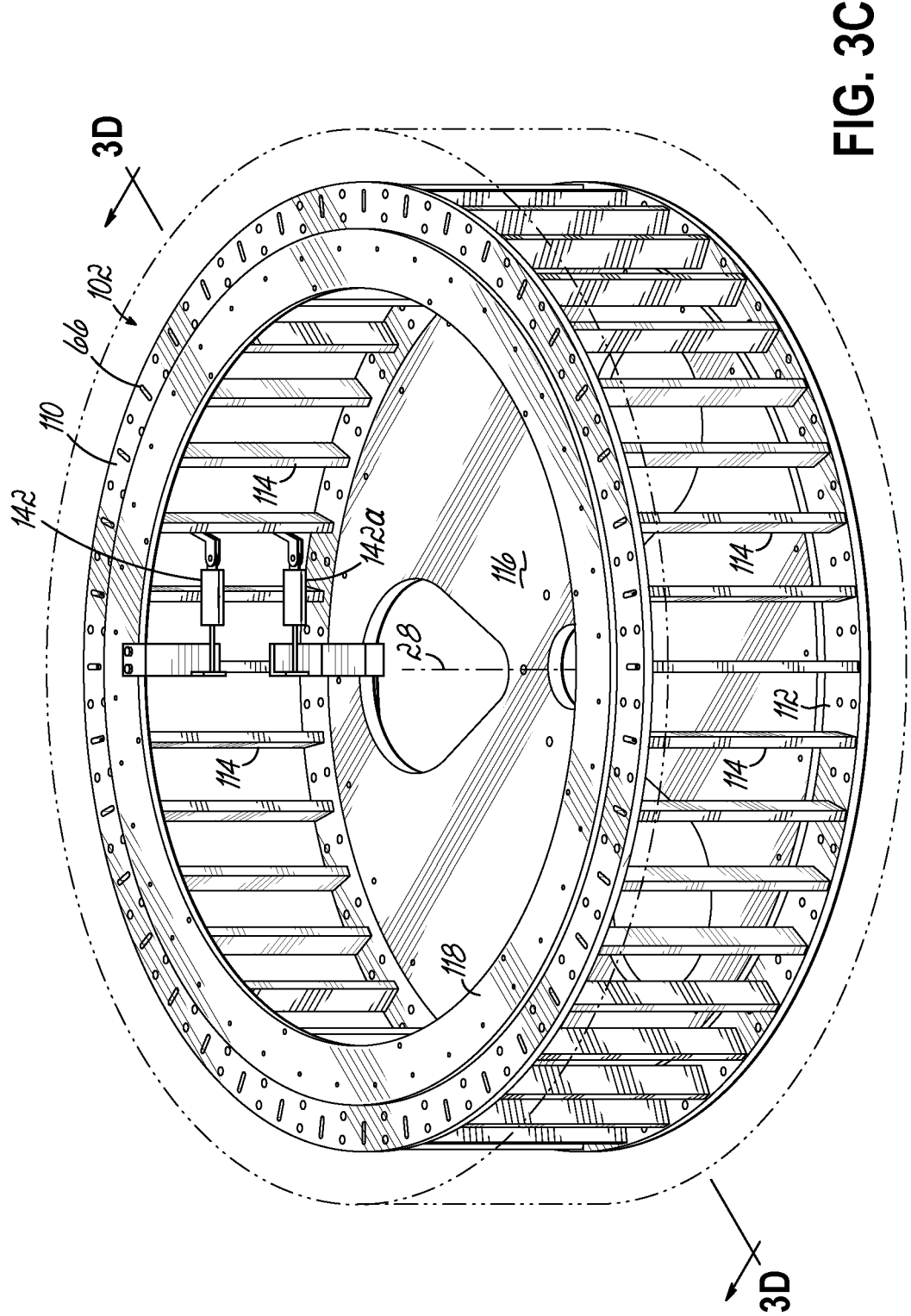
FIG. 3C is a partial schematic perspective view of the pouch machine vertical sealer of FIG. 3, illustrating shifter ring air cylinder assemblies.
Figure 3E:
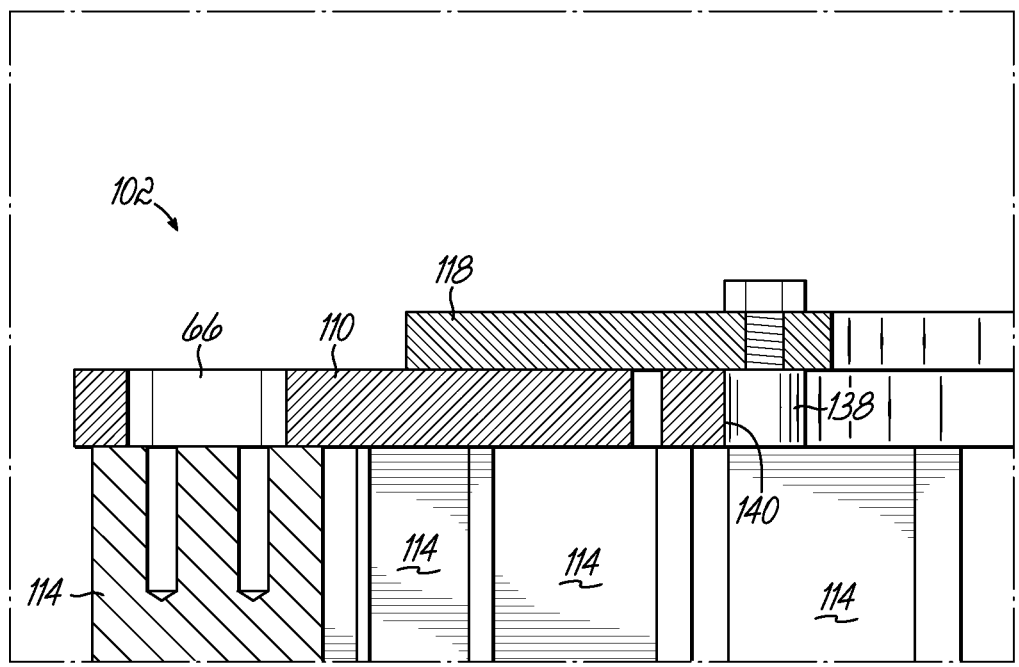
FIG. 3E is an enlarged view of area 3E of FIG. 3D, illustrating roller bearings of an upper shifter ring.

As briefly described above, the upper shifter ring 118 includes a plurality of cam rollers 136 spaced about an upper surface of the shifter ring 118. Each cam roller 136 is configured to engage with a corresponding bracket 128 of one land housing 108. There may be 40 cams on the upper shifter ring 118, for example. The upper shifter ring 118 is supported on the upper annular plate 110 so as to be rotatable thereabout. The engaged surfaces of the upper shifter ring 118 and upper annular plate 110 may be wear surfaces or be lubricated to facilitate movement therebetween, for example. In this regard, the upper shifter ring 118 is rotatable and shares an axis of rotation with the axis of rotation 28 of the sealer wheel 100. As best shown in FIG. 3E, to facilitate coupling of the upper shifter ring 118 to the upper annular plate 110, as well as rotational movement of the upper shifter ring 118 about the upper annular plate 110, the upper shifter ring 118 may include a plurality of bearings 138 configured to engage with and roll along an inner edge 140 of the upper annular plate 110. As best shown in FIGS. 3C and 3D, rotation of the upper shifter ring 118 is caused by cylinder 142 which may be air actuated. As shown, the cylinder 142 is connected between the upper annular plate 110 and the upper shifter ring 118 such that actuation of the cylinder 142 generates a tangential force on the shifter ring 118 to cause the shifter ring 118 to rotate within a range of between 2° to 20° relative to the sealer wheel 102. In the embodiment shown, actuation of the cylinder 142 causes the shifter rings 118 to rotate approximately 5° relative to the sealer wheel 102.

Figure 3F:
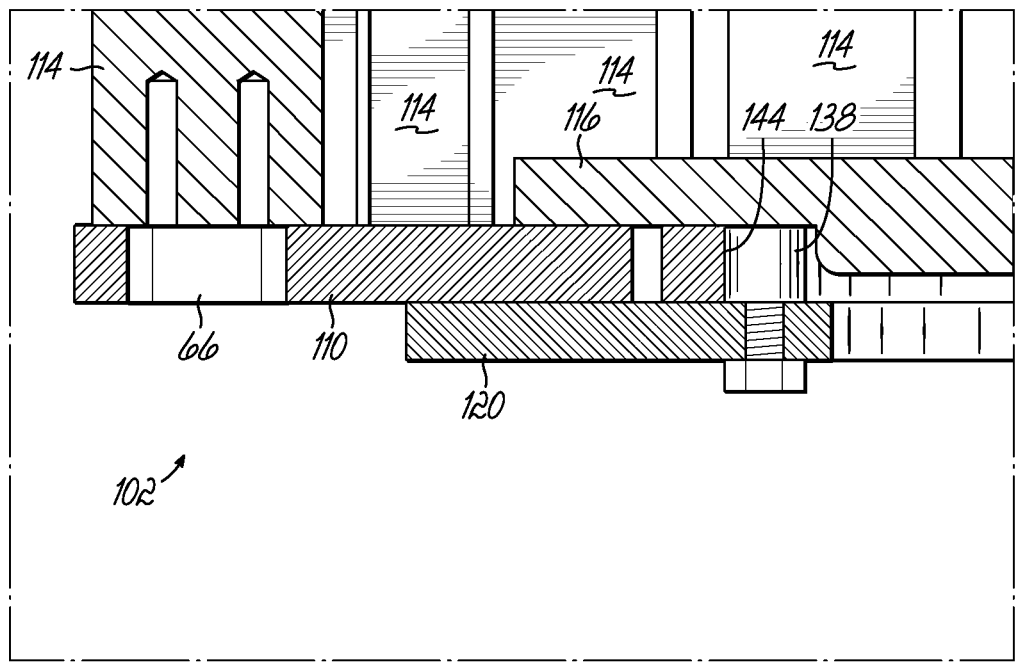
FIG. 3F is an enlarged view of area 3F of FIG. 3D, illustrating roller bearings of a lower shifter ring.

Similar to the upper shifter ring 118, the lower shifter ring 120 also includes a plurality of cam rollers 136 spaced about the lower shifter ring 120, each of which are configured to engage with a corresponding bracket 128 of one land housing 108. The lower shifter ring 120 may also have 40 cam rollers, for example. The lower shifter ring 120 is in engagement with the lower annular plate 112 so as to be rotatable thereabout, and the engaged surfaces may be wear surfaces or be lubricated to facilitate movement therebetween, for example. The lower shifter ring 120 is also rotatable and shares an axis of rotation with the axis of rotation 28 of the sealer wheel 102. As best shown in FIG. 3F, to facilitate coupling of the lower shifter ring 120 to the lower annular plate 112, as well as rotational movement of the lower shifter ring 120 about the lower annular plate 112, the lower shifter ring 120 may also include a plurality of bearings 138 configured to engage with and roll along an inner edge 144 of the lower annular plate 112. As best shown in FIGS. 3C and 3D, rotation of the lower shifter ring 120 is caused by a cylinder 142a, and more particularly a tangential force on the shifter ring 120 from the cylinder 142a, which may be air actuated. The cylinder 142a is connected between the lower annular plate 112 and the lower shifter ring 120 such that actuation of the cylinder 142a causes the shifter ring 120 to rotate within a range of between 2° to 20° about the axis of rotation 28. In the embodiment shown, actuation of the cylinder 142a causes the shifter ring to rotate approximately 5°. As described in further detail below, rotation of the shifter rings 118, 120 causes radial movement of the land housings 108 and respective vertical sealer land assemblies 32.

Figure 4:
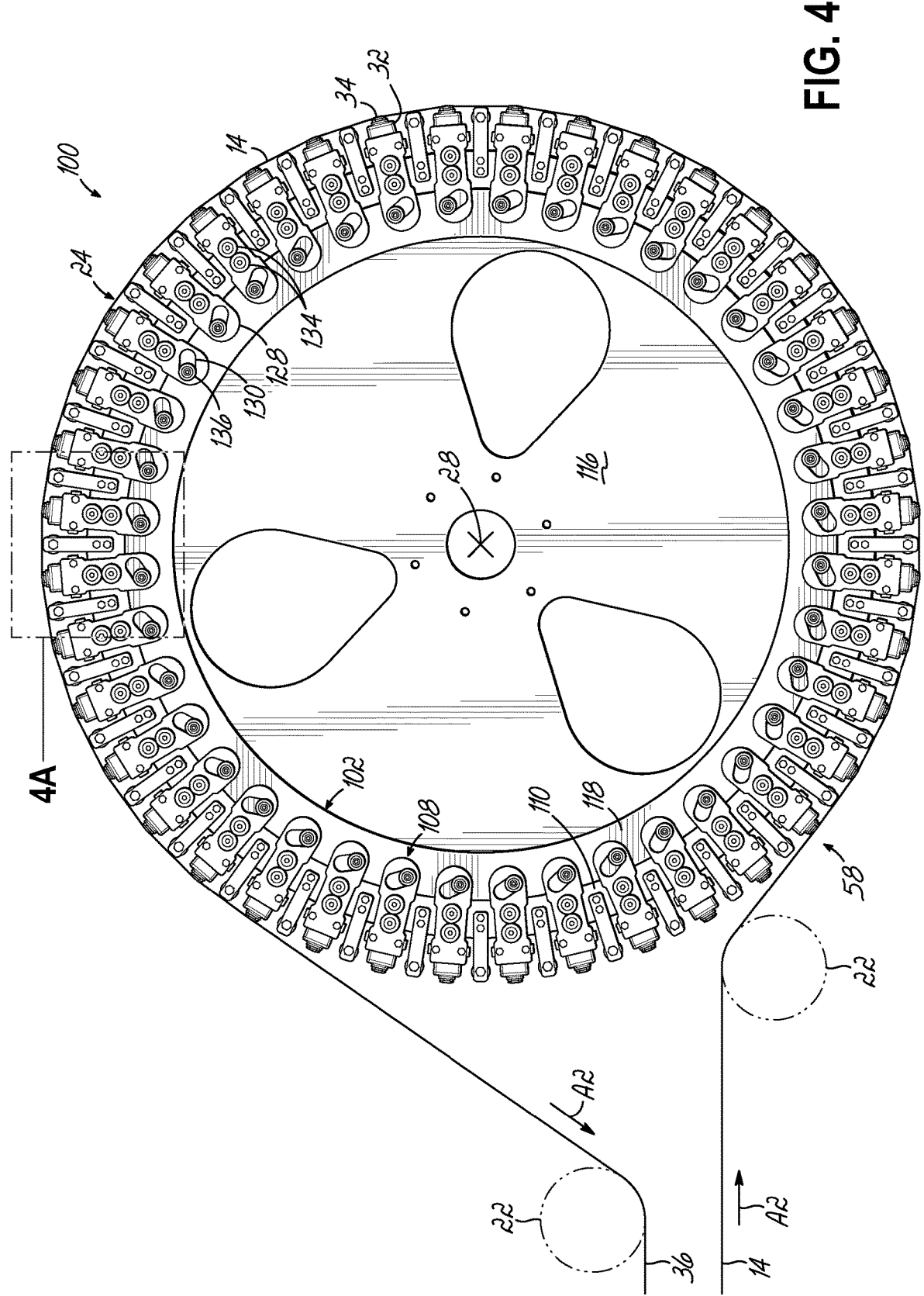
FIG. 4 is a top view of the pouch machine vertical sealer wheel of FIG. 3, illustrating the movable vertical sealer land assemblies in an operative position.
Figure 4A:
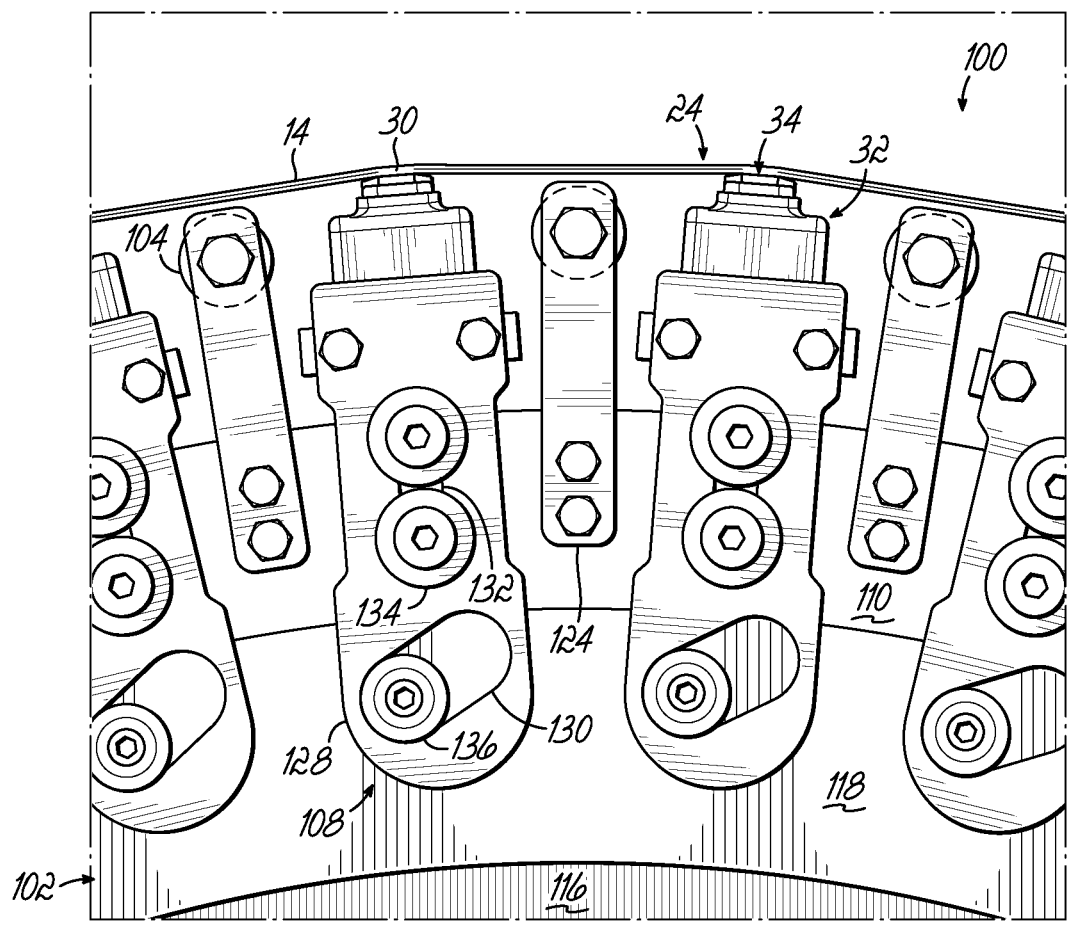
FIG. 4A is an enlarged view of area 4A of FIG. 4, illustrating contact between a film web and vertical sealer land assemblies of the vertical sealer wheel.

Rotation of the upper shifter ring 118 and the lower shifter ring 120 is performed in unison to move each land housing 108 and associated vertical sealer land assemblies 32 between the operative position and the retracted position during operation of the vertical sealer 100 and pouch machine 10. In this regard, FIG. 4 illustrates the plurality of land housings 108 in the operative position, in which each vertical sealer land assembly 32 is fully extended, in a radial direction away from the axis of rotation 28 of the sealer wheel 102, to position the vertical sealer lands 34 in engagement with the film web 14 for forming vertical seals 30 therealong. Typically, when the vertical sealer land assemblies 32 are in the operative position the vertical sealer lands 34 are being activated to form the vertical seals 30, but this does not need to be the case. When in the operative position, the upper and lower shifter rings 118, 120 are rotated counterclockwise such that each of the plurality of cam rollers 136, of the upper and lower shifter rings 118, 120, engage with cam drive slots 130 of corresponding brackets 128. As a result of the cam drive slots 130 being angled, movement of the cam rollers 136 within each drive slot 130 causes the land housings 108 to extend from the sealer wheel 102, in a radially outward direction, to the operative position. As shown in FIG. 4A, when in the operative position, the film web 14 may be engaged with only the vertical sealer lands 34 such that the film web 14 is spaced away from each of the plurality of rollers 104.

Figure 5:
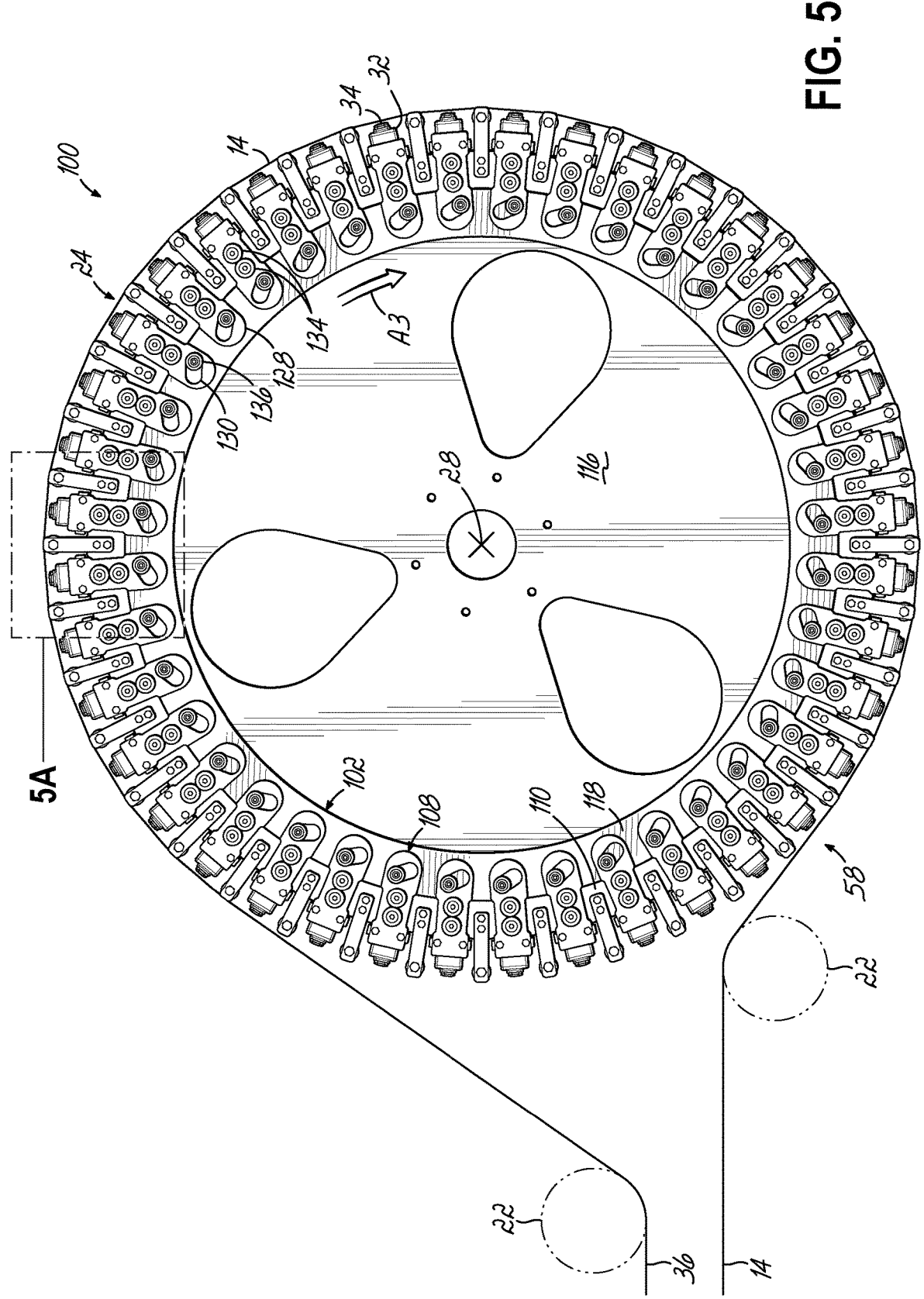
FIG. 5 is a top view of the pouch machine vertical sealer wheel of FIG. 3, illustrating the movable vertical sealer land assemblies in a retracted position.
Figure 5A:
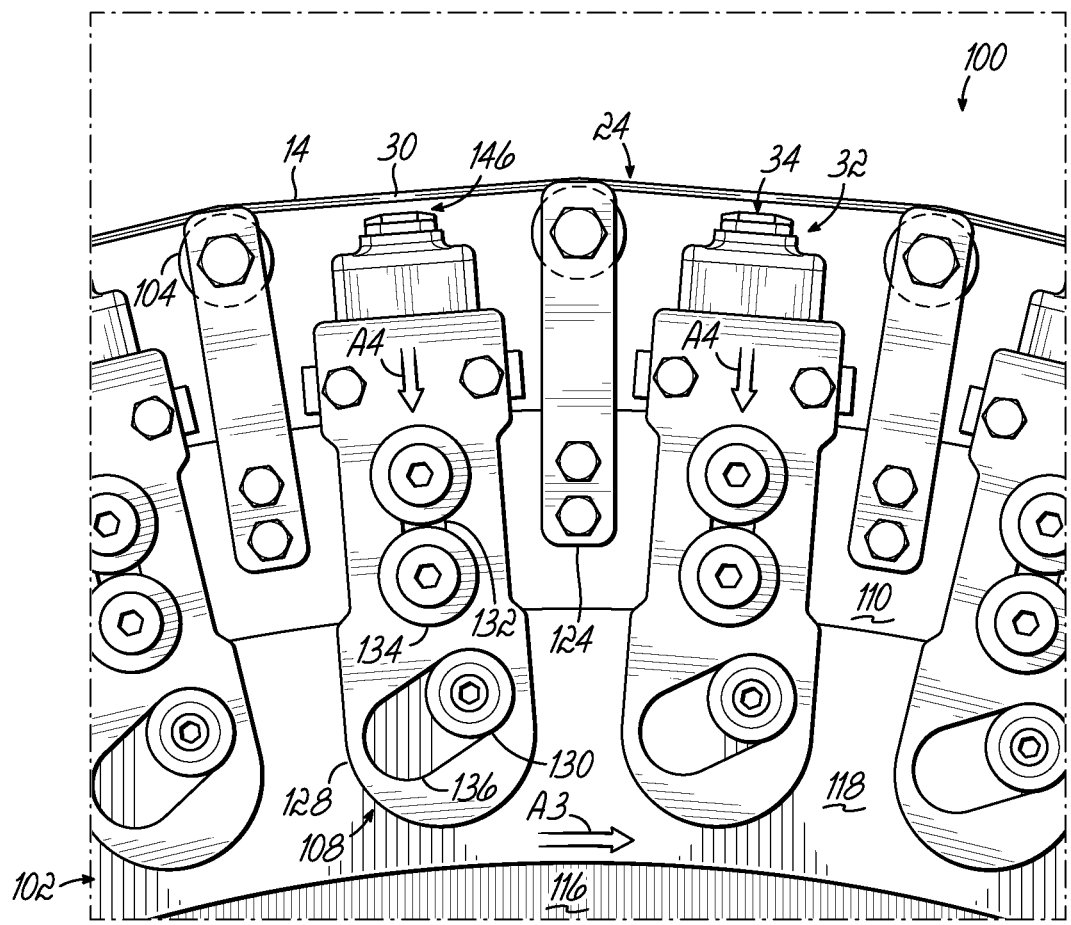
FIG. 5A is an enlarged view of area 5A of FIG. 5, illustrating the vertical sealer lands of the vertical sealer land assemblies spaced away from the film web with the film web supported by the stationary rollers.

With reference to FIGS. 5 and 5A, rotation of the upper shifter ring and the lower shifter ring 118, 120 in the clockwise direction, as indicated by directional arrow A3, is causes the land housings 108 and vertical sealer land assemblies 32 to be retracted, or moved from the operative position to the retracted position, as indicated by directional arrow A4 in FIG. 5A. When so positioned, the vertical sealer lands 34 are spaced away from the film web 14, in a radially inward direction toward the vertical axis of rotation 28 of the sealer wheel 102, to form an air gap 146 between the film web 14 and land 34 of each vertical sealer land assembly 32. Actuation of the shifter rings 118, 120 in this regard may be performed to achieve rapid separation between the film web 14 and the vertical sealer lands 34 to prevent over heating of the film web 14 during a stoppage event, or for any other reason. The vertical sealer lands 34 may continue to be activated, or turned off, when in the retracted position. As best shown in FIG. 5A, when the shifter rings 118, 120 are moved in the clockwise direction A3, the plurality of cam rollers 136 of the upper and lower shifter rings 118, 120 engage with respective cam drive slots 130 of corresponding brackets 128 to retract the land housings 108 in a radially inward direction A4. Movement of the land housings 108 in this regard lowers the film web 14 into engagement with the plurality of rollers 104 which support the film web 14 off of the retracted vertical sealer lands 34 to form the gap 146 therebetween.

Radial movement of each land housing 108 between the retracted position and the extended, or operative position, as described above, is guided via the two slideable fasteners 134 positioned through each radial drive slot 132 in the pair of brackets 128. In this regard, the slideable fasteners 134 couple the land housing 108 to the sealer wheel 102 yet permit linear movement of the land housing 108 as it is moved between the retracted position and the operative position by the shifter rings 118, 120. The slideable fasteners 134 may be a nut, washer, and bolt combination, or pin, for example.

With reference to FIGS. 6-8A, wherein like reference numerals represent like features, details of an exemplary pouch machine vertical sealer 200 are shown in accordance with another embodiment of the present invention. The pouch machine vertical sealer 200 may be used with the pouch machine 10 described above. The primary differences between the vertical sealer 200 of this embodiment and the vertical sealer 100 of the previously described embodiment is that the vertical sealer land assemblies 32 are radially fixed relative to a sealer wheel 202 of the vertical sealer 200 and the rollers 104 are movably coupled to the sealer wheel 202 with a roller housing 204 for radially extending the rollers 104, in a radially outward direction relative to the sealer wheel 202, to achieve rapid separation between the film web 14 and the vertical sealer lands 34 in contact with the film web 14 to prevent over heating of the film web 14 during stop/dwell/restart operations of the vertical sealer 200.

As shown, the sealer wheel 202 includes upper and lower annular plates 110, 112 spaced apart and coupled together by a plurality of webs 206. The sealer wheel 202 is generally cylindrical in shape and includes a circular base plate 116 coupled to the lower annular plate 112. The sealer wheel 202 includes a plurality of vertical sealer land assemblies 32 which are fixed in place during operation of the vertical sealer 200. The sealer wheel 202 also a plurality of rollers 104 which are each movably attached to the sealer wheel 202 with a respective roller housing 204. The roller housing 204 is for radially moving the respective roller 104 between an idle position where the respective roller is spaced away from the film web 14, in a radially inward direction toward the vertical axis of rotation 28 of the sealer wheel 202, and an extended position, where the respective roller 104 is moved in a radially outward direction away from the vertical axis of rotation 28 of the sealer wheel 202 and in contact with the film web 14 to support the film web 14 away from the plurality of vertical sealer lands 34. Similar to the previously described embodiment, movement of the roller housings 204 is caused by actuation of upper and lower shifter rings 118, 120 to which the roller housings 204 are operatively coupled.

Figure 6:
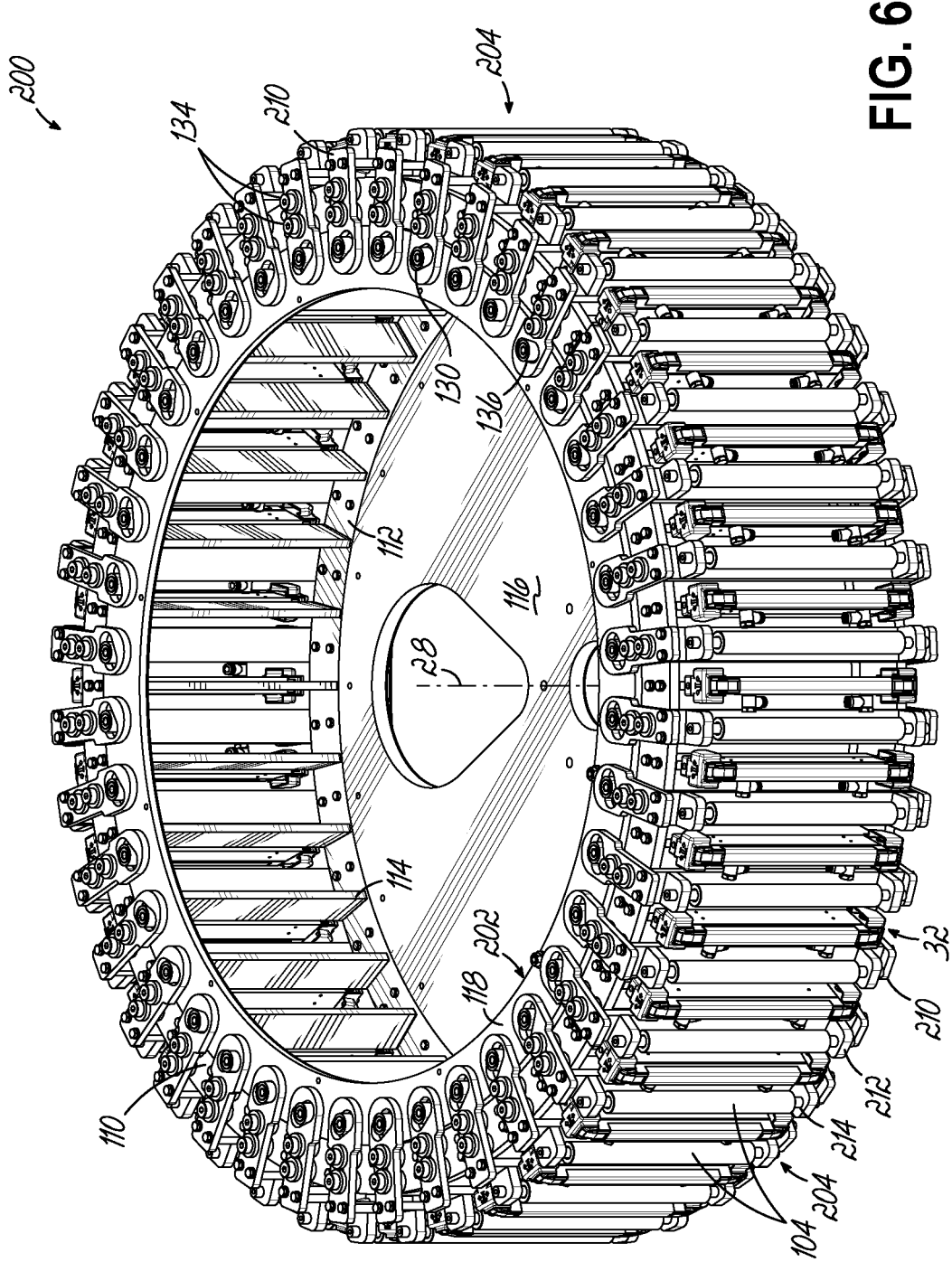
FIG. 6 is a perspective view of a pouch machine vertical sealer wheel having movable rollers in accordance with another embodiment of the invention.
Figure 6B:
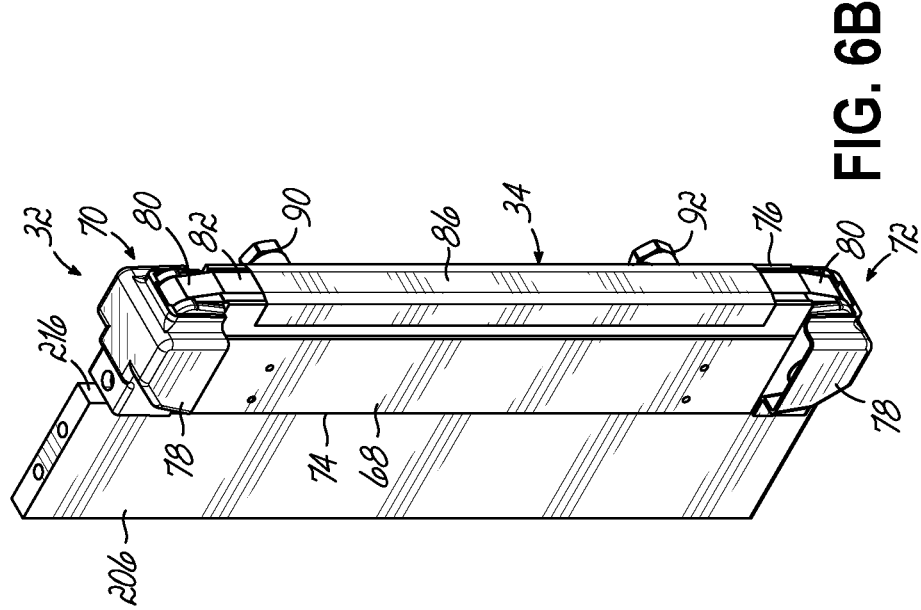
FIG. 6B is a perspective view of one stationary vertical sealer land assembly of FIG. 6.
Figure 6A:
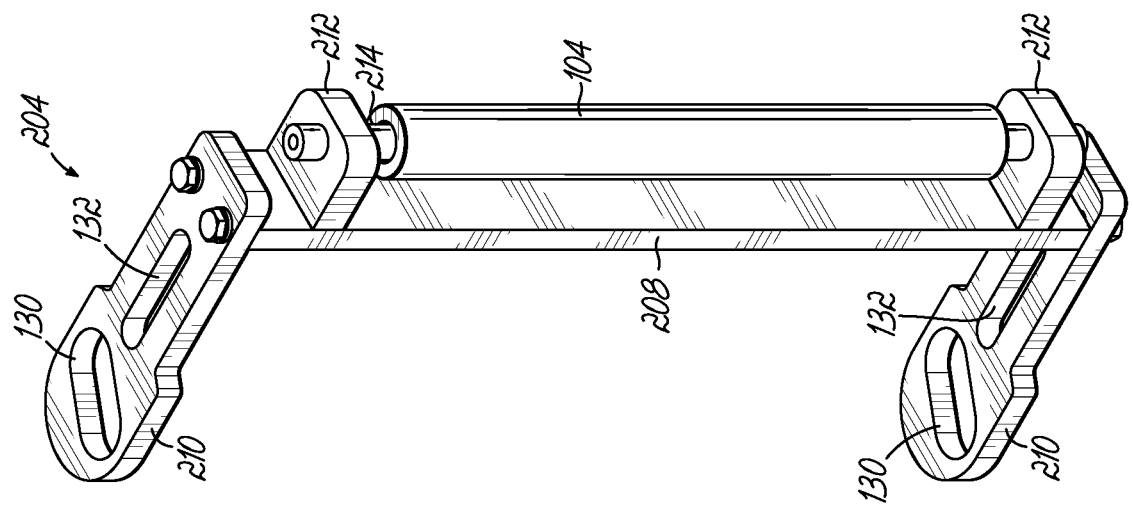
FIG. 6A is a perspective view of one movable roller of FIG. 6.

As shown in FIG. 6A, each roller housing 204 includes a plate-like support member 208 coupled between a pair of brackets 210. The support member 208 has an outwardly facing surface configured to rotatably support the roller 104. In this regard, the support member 208 includes two mounts 212 between which an axle 214 of the roller extends. The roller 104 is rotatably supported by the axle 212 on the outwardly facing surface of the support member 208. Each bracket 210 is configured to operatively couple the roller housing 204 to the sealer wheel 202 and includes a cam drive slot 130 and a radial drive slot 132. The cam drive slots 130 are oblong in shape and formed in each bracket 210 at an angle. As shown in FIG. 6, one bracket 210 is operatively coupled to both the upper annular plate 110 and upper shifter ring 118 with two slideable fasteners 134 positioned through the radial drive slot 132. The cam drive slot 130 of the bracket 210 is engaged with a corresponding cam roller 136 on the upper shifter ring 118 that is configured to radially move the housing 210, as will be described in further detail below. Similarly, the other bracket 210 is operatively coupled to both the lower annular plate 112 and lower shifter ring 120 with two slideable fasteners 134 positioned through the radial drive slot 132. The cam drive slot 130 of the bracket 210 is engaged with a corresponding cam roller 136 on the lower shifter ring 120. As shown in FIG. 6B, each vertical sealer land 32 is coupled to an outwardly facing surface 216 of each web 206. Thus, the vertical sealer land assemblies 32 are radially fixed during operation of the vertical sealer 200.

Figure 7:
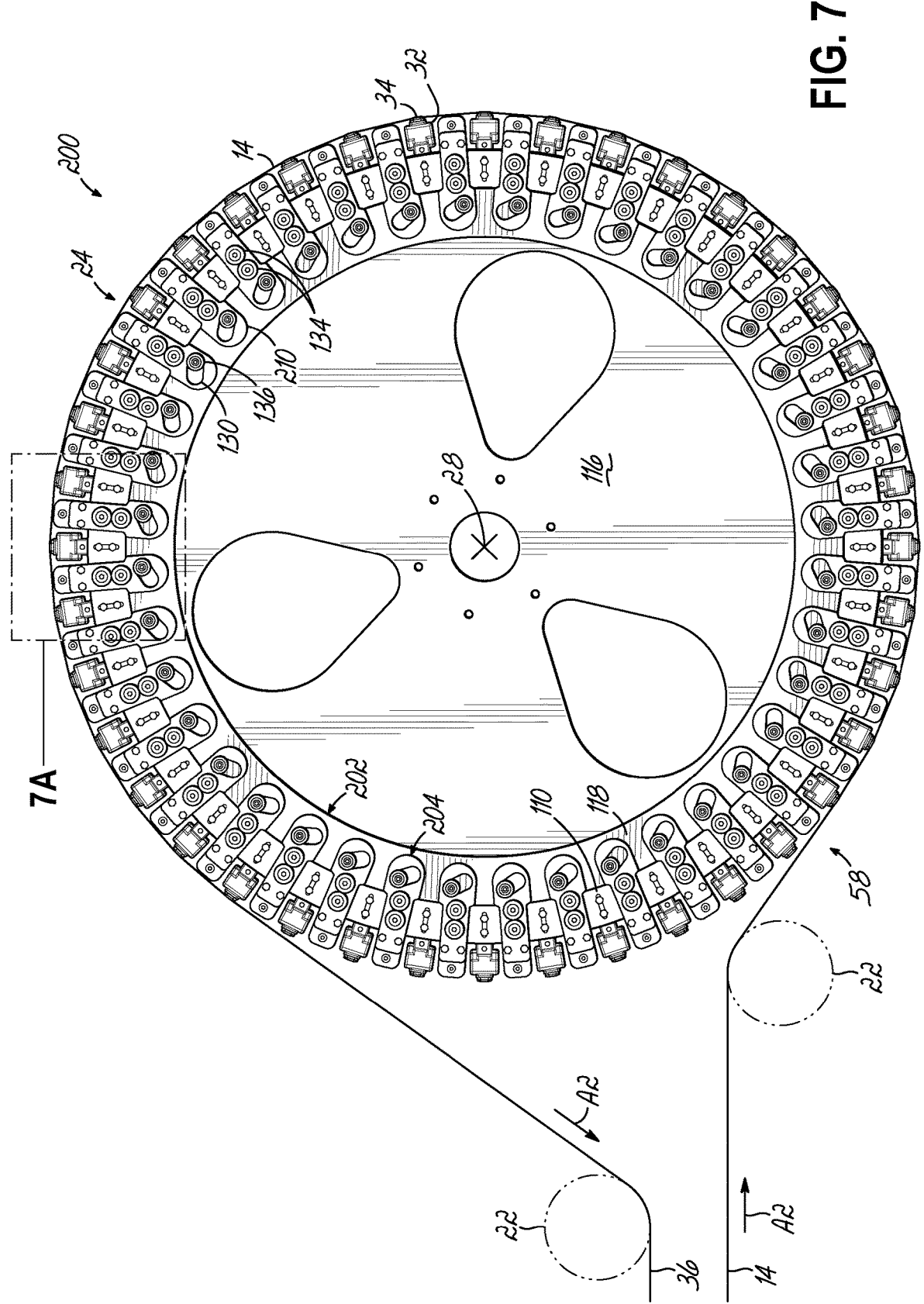
FIG. 7 is a top view of the pouch machine vertical sealer wheel of FIG. 6, illustrating the movable rollers an idle position.
Figure 7A:
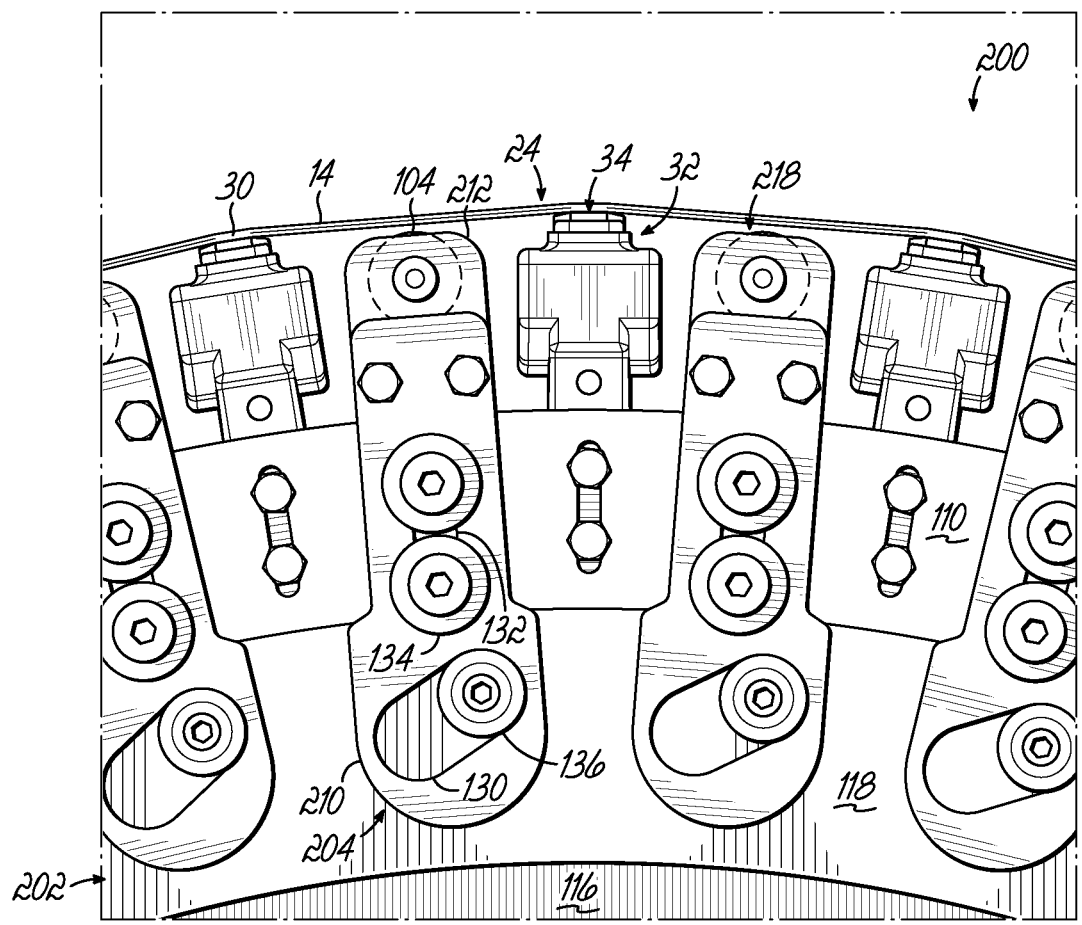
FIG. 7A is an enlarged view of area 7A of FIG. 7, illustrating the rollers in the idle position with the film web in contact with vertical sealer lands of the stationary vertical sealer land assemblies.

The upper shifter ring and the lower shifter ring 118, 120 rotate in unison to move each roller housing 204 and associated roller 104 between the idle position the extended position during operation of the vertical sealer 200 and pouch machine 10. In this regard, FIGS. 7 and 7A illustrates the plurality of roller housings 204 in the idle position, in which each roller 104 is retracted, in a radially inward direction from the film web 14 and toward the axis of rotation 28 of the sealer wheel 202, to space the rollers 104 away from the film web 14 so that the film web 14 engages with the vertical sealer lands 34 for forming vertical seals 30 therealong. To this end, clockwise rotation of the upper and lower shifter rings 118, 120 causes the cam rollers 136 to engage with cam drive slots 130 of corresponding brackets 210 to retract the roller housings 204 to the idle position. As shown in FIG. 7A, when in the idle position, the rollers 104 are spaced a distance away from the film web 14 to form an air gap 218 therebetween. In this regard, the film web 14 is only in contact with the vertical sealer lands 34. Typically, when the rollers 104 are in the idle position the vertical sealer lands 34 are being activated to form the vertical seals 30, but this does not have to be the case and the lands 34 may be deactivated, for example.

Figure 8A:
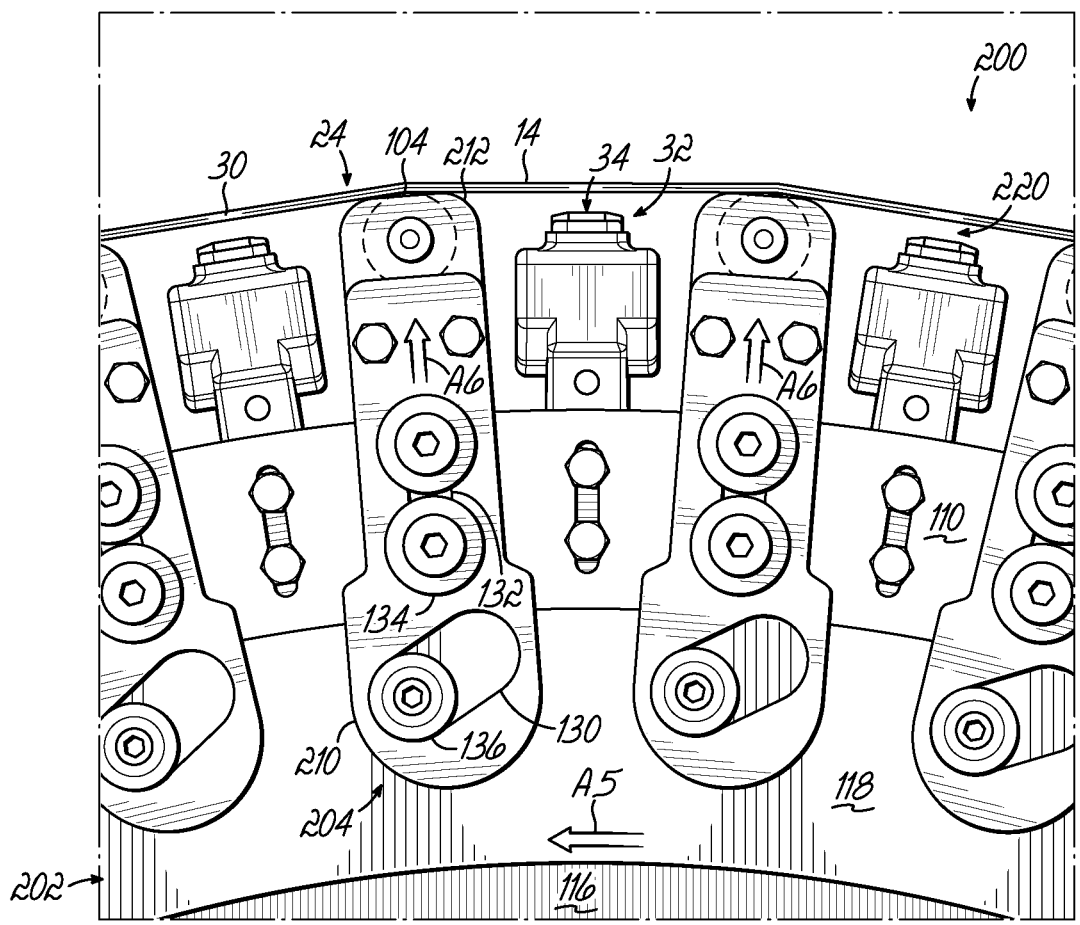
FIG. 8A is an enlarged view of area 8A of FIG. 8, illustrating the rollers in the extended position to lift the film web away from the vertical sealer lands.

With reference to FIGS. 8 and 8A, the upper and lower shifter rings 118, 120 are rotated in a counterclockwise direction, as indicated by directional arrow A5, to cause the roller housings 204 and rollers 104 to move in an outward direction to the extended position. More particularly counterclockwise rotation of the upper and lower shifter rings 118, 120 causes the cam rollers 136 to engage with cam drive slots 130 of corresponding brackets 210 to radially move the roller housings 204 to the extended position, as shown by directional arrow A6. When so positioned, as shown, the rollers 104 contact the film web 14 and lift the film web 14 off of the vertical sealer lands 34. More particularly, the film web 14 is moved in a radially outward direction to create an air gap 220 between the film web 14 and the vertical sealer land 34 of each vertical sealer land assembly 32. Actuation of the shifter rings 118, 120 to move the rollers 104 to their extended position may be performed to achieve rapid separation between the film web 14 and the vertical sealer lands 34 to prevent over heating of the film web 14 during a stoppage event, or for any other reason. To this end, the vertical sealer lands 34 may continue to be activated, or turned off, when the rollers 104 are in their extended position. Similar to the previously described embodiment, radial movement of each roller housing 204 between the idle position and the extended position, as described above, is guided via the two slideable fasteners 134 positioned through each radial drive slot 132 in the pair of brackets 210.

With reference to FIGS. 9A-11A, wherein like reference numerals represent like features, details of an exemplary pouch machine vertical sealer 300 (e.g., FIG. 10) are shown in accordance with another embodiment of the present invention. The pouch machine vertical sealer 300 may be used with the pouch machine 10 described above. The primary differences between the vertical sealer 300 of this embodiment and the vertical sealer 200 of the previously described embodiment is that the rollers 104 are pivotably coupled to a sealer wheel 302 of the vertical sealer 300 with a housing 304 for pivoting the rollers in a radially outward direction to an extended position to achieve the rapid separation between the film web 14 and the vertical sealer lands 34 in contact with the film web 14 to prevent over heating of the film web 14 during stop/dwell/restart operations of the vertical sealer 300.

Figure 9B:
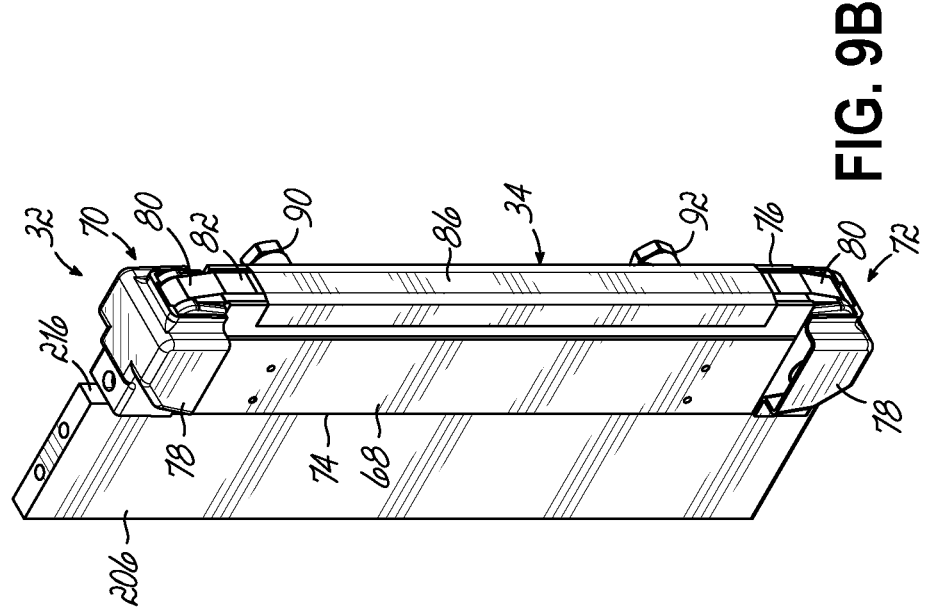
FIG. 9B is a perspective view of one stationary vertical sealer land assembly.
Figure 9A:
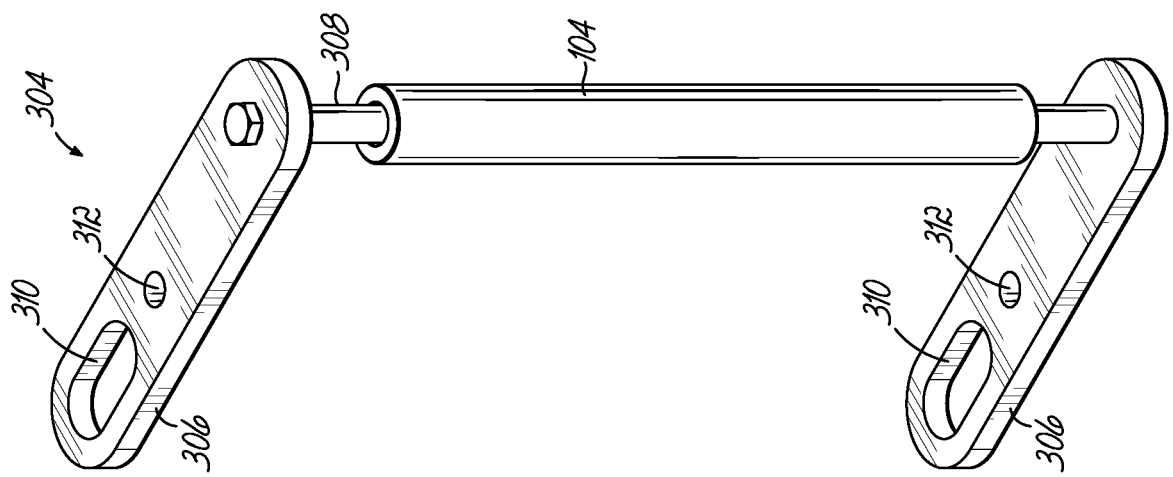
FIG. 9A is a perspective view of one pivotable roller according to another embodiment of the invention.

FIG. 9A illustrates the pivotable housing 304 used to operatively support each roller 104 from the sealer wheel 300. The housing 304 includes a pair of brackets 306 between which an axle 308 is coupled for rotatably supporting the roller 104. Each bracket 306 includes a cam drive slot 310 and a pivot bore 312. In this regard, with brief reference to FIG. 10, one bracket 306 is operatively coupled to both the upper annular plate 110 and upper shifter ring 118 with a nut, bolt, and washer combination 314, or pin, positioned through the pivot bore 312. The cam drive slot 310 of the bracket 306 is engaged with a corresponding cam roller 136 on the upper shifter ring 118 used to pivot the housing 304 to thereby move the roller 104 in a radially outward direction, as will be described in further detail below. While not shown, the other bracket 306 is operatively coupled to both the lower annular plate 112 and lower shifter ring 120 with a nut, bolt, and washer combination 314, or pin, positioned through the pivot bore 312. To this end, the cam drive slot 310 of the bracket is engaged with a corresponding cam roller 136 on the lower shifter ring 120.

As shown in FIG. 9B, each vertical sealer land assembly 32 is coupled to an outwardly facing surface 216 of each web 206. Thus, similar to the previously described embodiment, the vertical sealer land assemblies 32 are radially fixed during operation of the vertical sealer 200.

Figure 10:
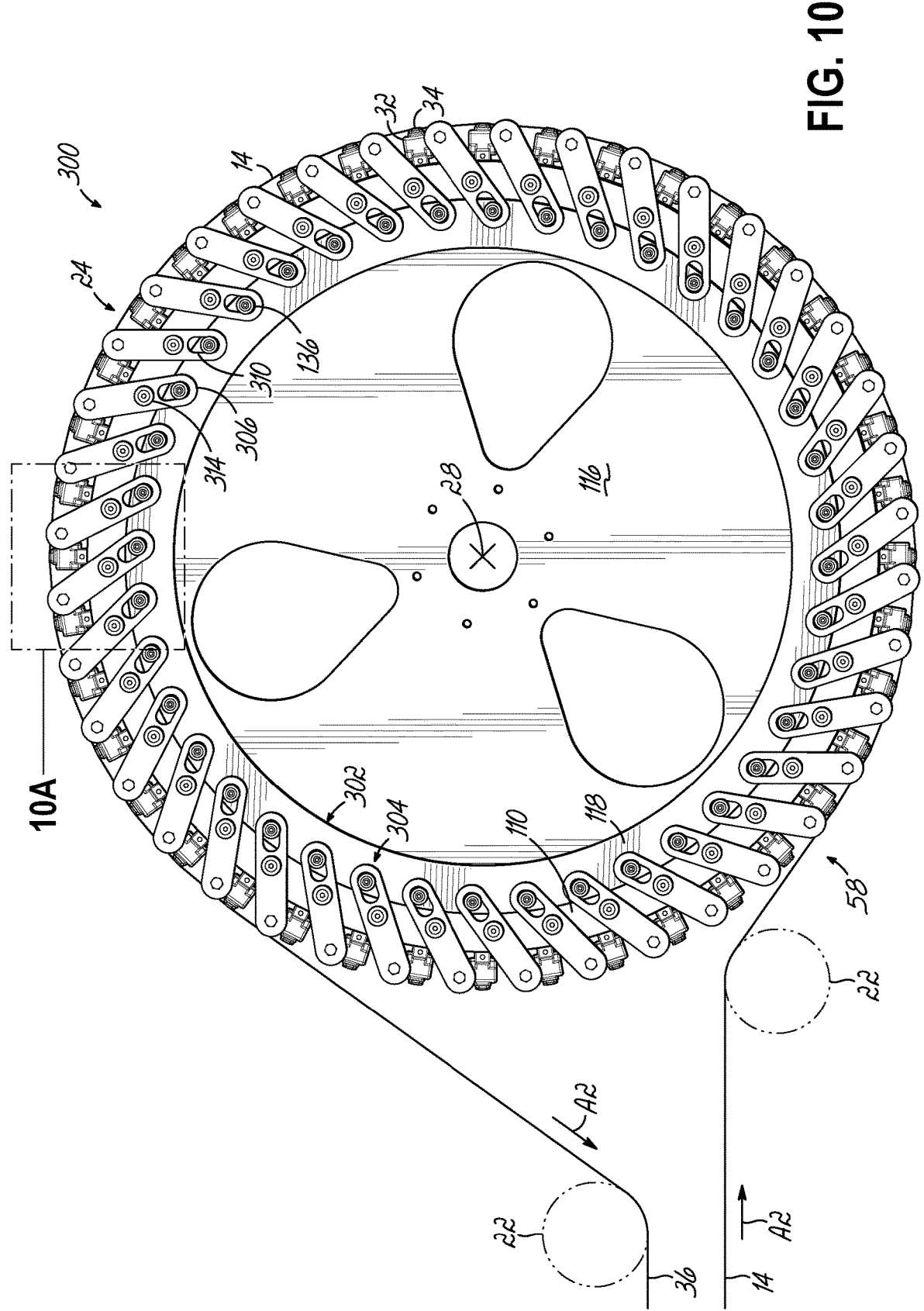
FIG. 10 is a top view of a vertical sealer with a plurality of the pivotable rollers of FIG. 9A, illustrating the rollers in an idle position.
Figure 11:
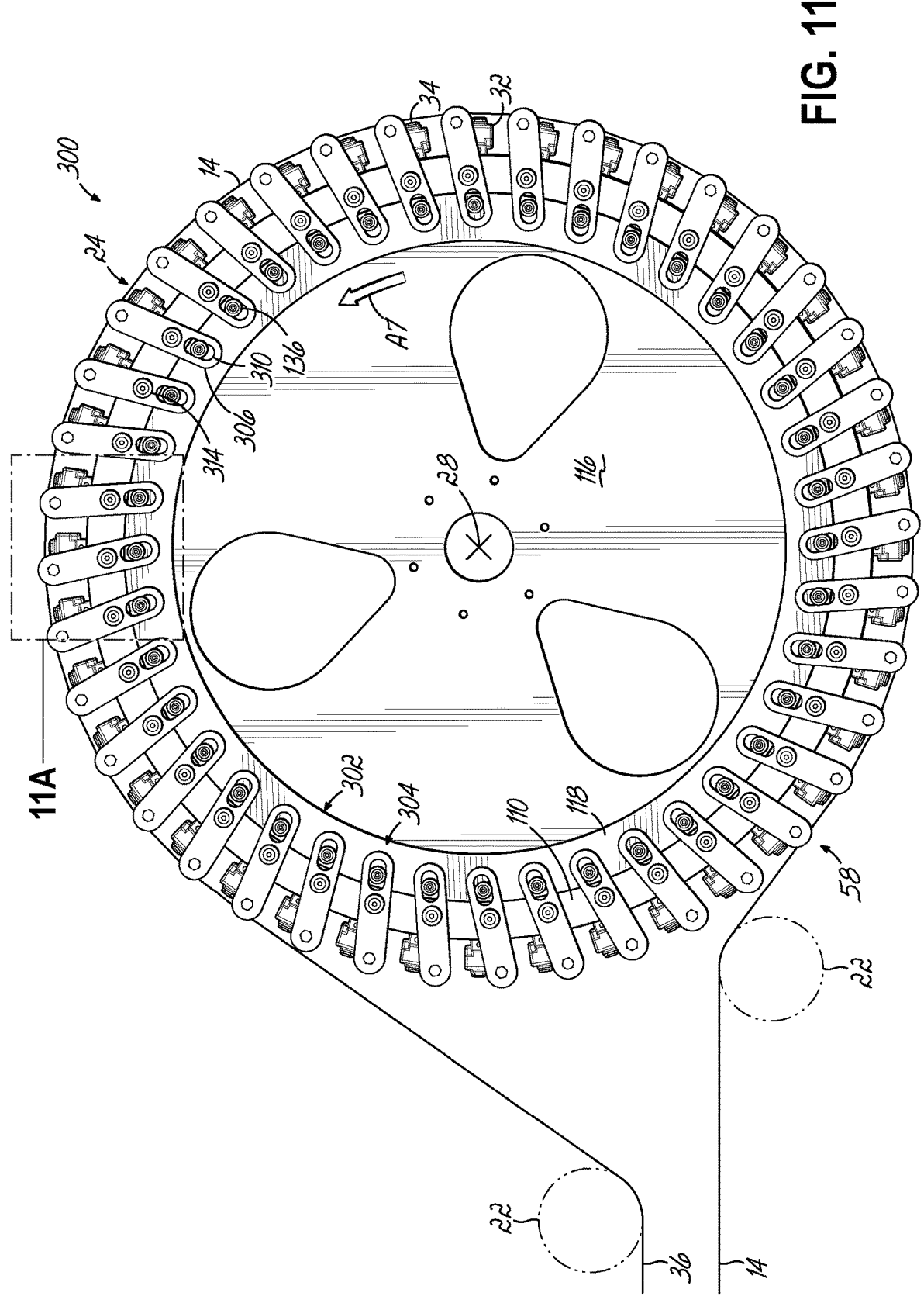
FIG. 11 is a top view of the pouch machine vertical sealer wheel of FIG. 10, illustrating the pivotable rollers in an extended position.
Figure 11A:
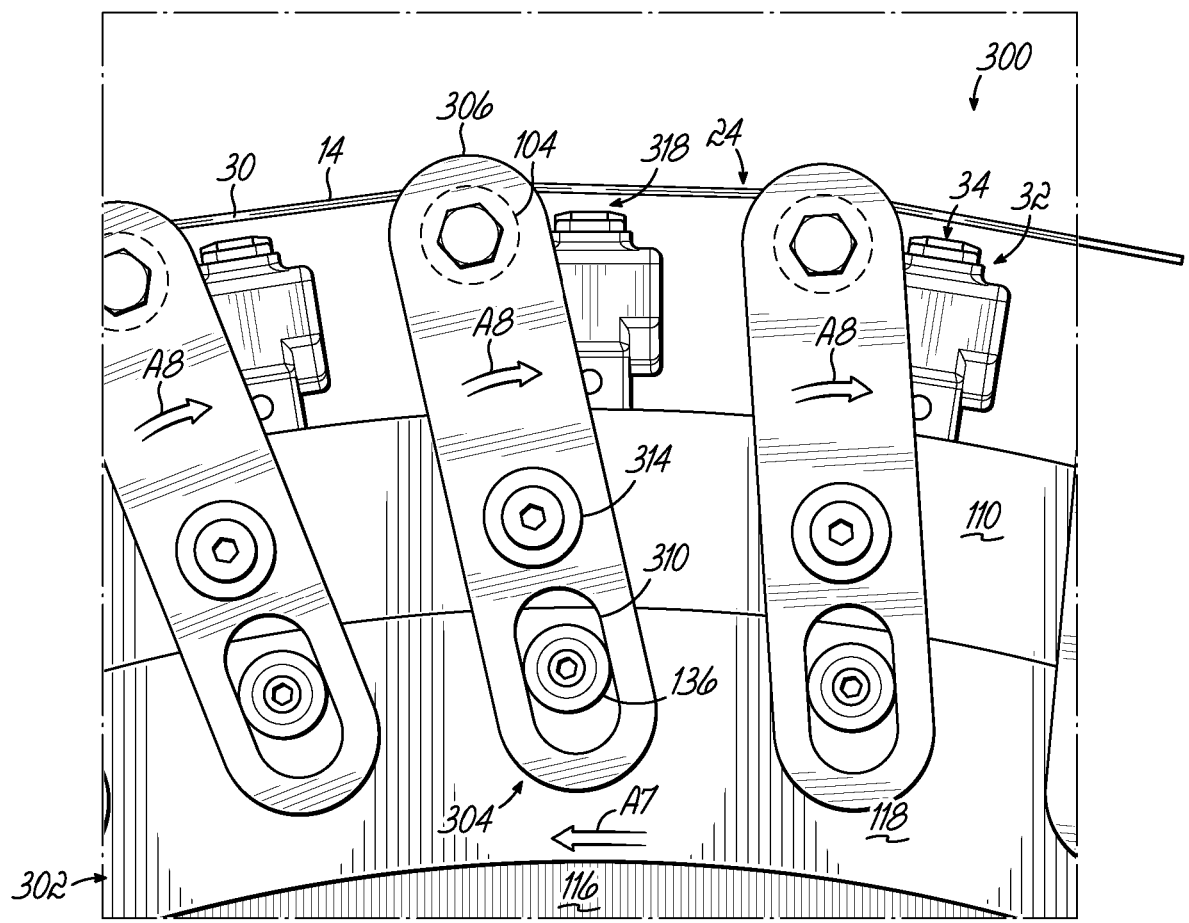
FIG. 11A is an enlarged view of area 11A of FIG. 11, illustrating the pivotable rollers in the extended position to lift the film web away from the vertical sealer lands.

With reference to FIG. 10-11A, the sealer wheel 302 includes upper and lower annular plates 110, 112 spaced apart and coupled together by a plurality of webs 206, each of which support one vertical sealer land assembly 32, as described above. The sealer wheel 302 is generally cylindrical in shape and includes a circular base plate 116 coupled to the lower annular plate 112. The rollers 104 are each movably attached to the sealer wheel 202 with a respective housing 304. The housing 304 is for radially pivoting the respective roller 104 between an idle position where the respective roller 104 is spaced away from the film web 14, in a radially inward direction toward the vertical axis of rotation 28 of the sealer wheel 302, and an extended position, where the respective roller 104 is pivoted in a radially outward direction away from the vertical axis of rotation 28 of the sealer wheel 302 and in contact with the film web 14 to support the film web 14 away from the plurality of vertical sealer lands 34. Pivotal movement of the roller housings 304 is caused by actuation of upper and lower shifter rings 118, 120 to which each housing 304 is operatively coupled.

Figure 10A:
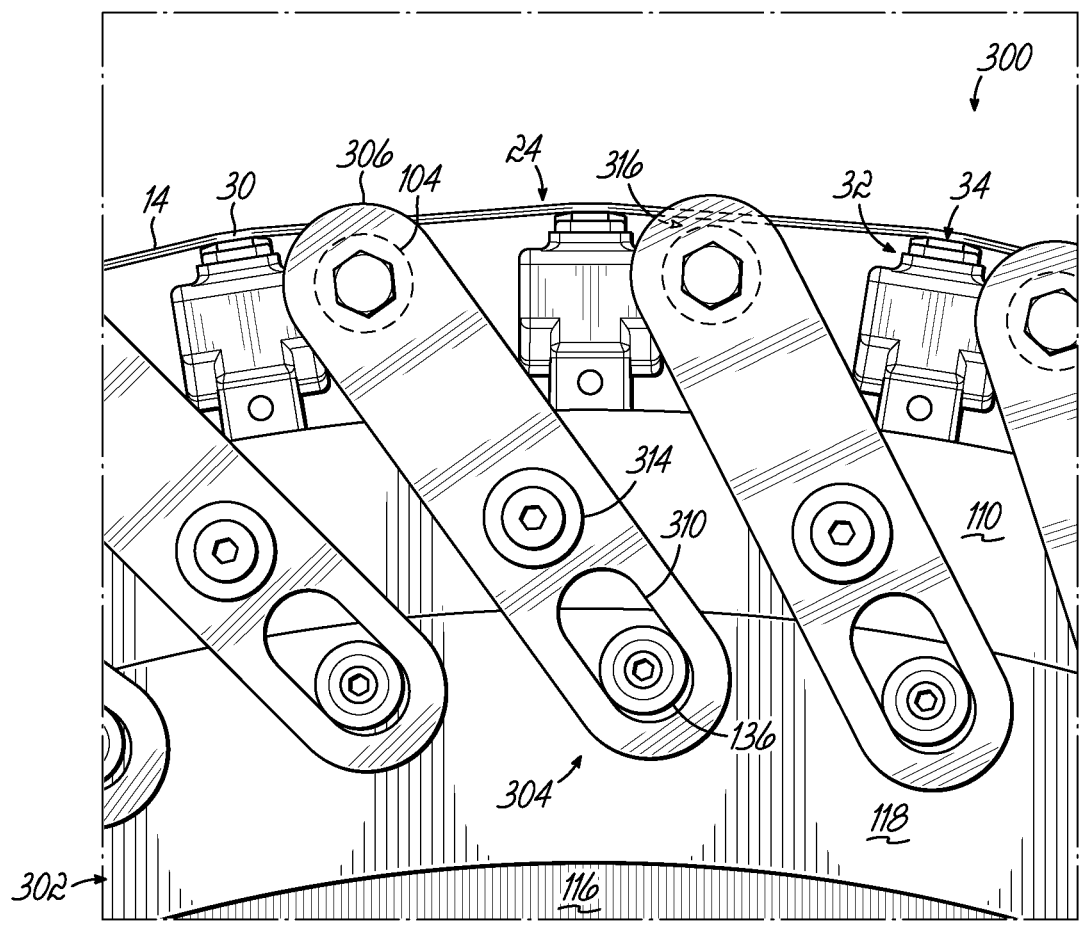
FIG. 10A is an enlarged view of area 10A of FIG. 10, illustrating the pivotable rollers in the idle position with the film web in contact with the vertical sealer lands.

With reference to FIGS. 10-10A, the plurality of housings 304 are shown in the idle position, in which each roller 104 is pivoted, in a radially inward direction away from the film web 14 and toward the axis of rotation 28 of the sealer wheel 302, to space the rollers 104 away from the film web 14 so that the film web is in contact with the vertical sealer lands 34 for forming vertical seals 30 therealong. In this regard, clockwise rotation of the upper and lower shifter rings 118, 120 causes the cam rollers 136 to engage with cam drive slots 310 of corresponding brackets 306 to pivot the housings 304 and each roller 104 about the pin 314 to the idle position, as shown. When so positioned, the rollers 104 are spaced a distance away from the film web 14 to form an air gap 316 therebetween, as best seen in FIG. 10A. In this regard, the film web 14 is only in contact with the vertical sealer lands 34.

With reference to FIGS. 11 and 11A, the upper and lower shifter rings 118, 120 are rotated in a counterclockwise direction, as indicated by directional arrow A7, to cause the housings 304 and rollers 104 to pivot in a radially outward direction, as indicated by directional arrow A8 (FIG. 11A), to the extended position, as shown. More particularly counterclockwise rotation of the upper and lower shifter rings 118, 120 causes the cam rollers 136 to engage with cam drive slots 310 of corresponding brackets 306 to pivot the housings 304 and each roller 104 about the pin 314 to locate the rollers 104 in the extended position. When so positioned, as best shown in FIG. 11A, the rollers 104 are in contact with the film web 14 to lift the film web 14 off of the vertical sealer lands 34. More particularly, the film web 14 is moved in a radially outward direction to create an air gap 318 between the film web 14 and the vertical sealer land 34 of each vertical sealer land assembly 32.

Figure 12:
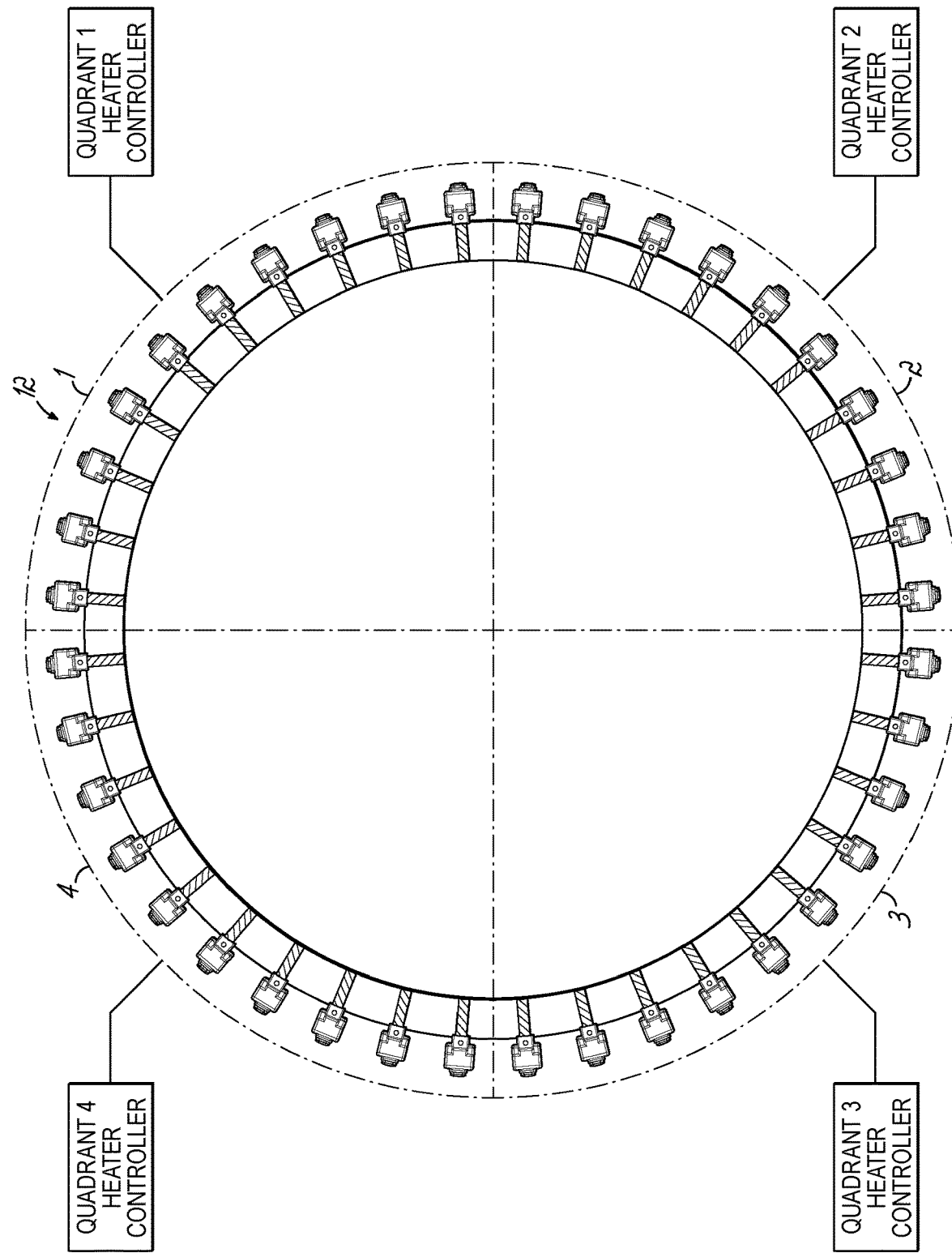
FIG. 12 is a top view of a vertical sealer wheel according to an embodiment of the invention, illustration a wiring scheme for the vertical sealer lands.

FIG. 12 illustrates an exemplary wiring scheme for the vertical sealer lands 34 of each vertical sealer land assembly 32 of the pouch machine vertical sealer 12 in accordance with an embodiment of the invention. As shown, the vertical sealer 12 is broken into four wiring quadrants 1, 2, 3, 4 that each include 10 vertical sealer land assemblies 32 and lands 34. The 10 vertical sealer lands assemblies 32 of each quadrant 1, 2, 3, 4 are wired in series so that the associated vertical sealer lands 34 are heated at the same time. Similarly, any data, such as temperature sensor data, is transmitted at the same time for the vertical sealer lands 34 of each quadrant 1, 2, 3, 4. It is understood that fewer or more wiring quadrants 1, 2, 3, 4 may be used. It is also within the scope of the invention to include fewer or more vertical sealer land assemblies 32 within each wiring quadrant 1, 2, 3, 4. For example, a vertical sealer 12 having 32 vertical sealer land assemblies 32 might have four wiring quadrants of 8 vertical sealer lands 34 wired in series. To this end, it is understood that any of the vertical sealers 100, 200, 300 described above could include the wiring scheme.

While the invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A pouch machine vertical sealer capable of fusing a pouch film web to form a plurality of spaced vertical seals along a length of the film web, comprising:
 a sealer wheel rotatable about a vertical axis of rotation and defining a film web path about a periphery of the sealer wheel;
 a plurality of vertical sealer land assemblies spaced apart about the periphery of the sealer wheel and each comprising a heater;
 a plurality of rollers spaced apart about the periphery of the sealer wheel with at least one roller being located between each of the plurality of vertical sealer land assemblies;
 wherein each of the plurality of vertical sealer land assemblies is supported about the sealer wheel by a land housing for radially moving the respective vertical sealer land assembly between an operative position wherein the respective heater of the vertical sealer land assembly is in contact with the film web and a retracted position wherein the respective heater of the vertical sealer land assembly is spaced away from the film web in a radially inward direction toward the vertical axis of rotation of the sealer wheel, and
 wherein contact between the film web and the impulse heater of each of the plurality of vertical sealer land assemblies forms the spaced apart vertical seals along a length of the film web.

2. The pouch machine vertical sealer of claim 1, wherein each heater is capable of heating up and cooling down.

3. The pouch machine vertical sealer of claim 1, wherein the plurality of vertical sealer land assemblies each include a cooling medium passageway for cooling of the respective vertical sealer land assembly and heater.

4. The pouch machine vertical sealer of claim 3, wherein the cooling medium passageway extends through the vertical sealer land assembly in a direction along a length of the respective heater.

5. The pouch machine vertical sealer of claim 1, wherein the plurality of rollers support the film web when the plurality of vertical sealer land assemblies are in the retracted position.

6. The pouch machine vertical sealer of claim 5, wherein the plurality of rollers are radially fixed.

7. The pouch machine vertical sealer of claim 1, wherein the sealer wheel further includes actuatable upper and lower shifter rings to which each land housing is operatively coupled for radially moving each vertical sealer land assemblies between the operative position and the retracted position.

8. The pouch machine vertical sealer of claim 7, wherein the upper and lower shifter rings each include cam rollers with one cam roller of the upper shifter ring in engagement with a cam drive slot in each land housing and one cam roller of the lower shifter ring in engagement with another cam drive slot in each land housing to radially move the plurality of vertical sealer land assemblies.

9. The pouch machine vertical sealer of claim 8, wherein the upper and lower shifter rings are each operatively coupled to the sealer wheel with an actuatable cylinder configured to rotate the upper and lower shifter rings about the vertical axis of rotation of the sealer wheel to radially move the plurality of vertical sealer land assemblies.

10. The pouch machine vertical sealer of claim 1, wherein the sealer wheel includes a top slip ring and a bottom slip ring with one of either the top slip ring or bottom slip ring being configured to transmit data between the heater of each of the plurality of vertical sealer land assemblies and a controller and the other one of the top slip ring or bottom slip ring being configured to transmit power to the at least one heater of each of the plurality of vertical sealer lands.

11. The pouch machine vertical sealer of claim 1, wherein the heater is an impulse heater.

12. A method of fusing a pouch film web to form a plurality of vertical seals along a length of the film web to form pouches, comprising:
 providing a pouch machine vertical sealer having a sealer wheel rotatable about a vertical axis of rotation and defining a film web path about a periphery of the sealer wheel, a plurality of vertical sealer land assemblies spaced apart about the periphery of the sealer wheel and each comprising a heater, and a plurality of rollers spaced apart about the periphery of the sealer wheel with at least one roller being located between each of the plurality of vertical seal land assemblies;
 rotating the vertical sealer to entrain the film web around the sealer wheel;
 engaging the film web with the heater of the plurality of vertical sealer land assemblies and sealing the film web to form a vertical seal at the heater of the plurality of vertical sealer land assemblies; and
 reciprocating one of the plurality of vertical sealer land assemblies or the plurality of rollers radially outwardly and inwardly with respect to the other one of the plurality of vertical sealer land assemblies or the plurality of rollers to selectively create a space between the film web and the heater of the plurality of vertical sealer land assemblies.

13. A method as in claim 12, wherein the plurality of vertical sealer land assemblies each include a cooling medium passageway for cooling of the respective heater, the method further comprising:
 selectively cooling each vertical sealer land assembly to limit heating of the web by the respective heater.

14. The method according to claim 12, wherein the heater is an impulse heater.

15. A pouch machine vertical sealer capable of fusing a pouch film web to form a plurality of spaced vertical seals along a length of the film web, comprising:
 a sealer wheel rotatable about a vertical axis of rotation and defining a film web path about a periphery of the sealer wheel;
 a plurality of vertical sealer land assemblies spaced apart about the periphery of the sealer wheel and each comprising a heater;
 a plurality of rollers spaced apart about the periphery of the sealer wheel with at least one roller being located between each of the plurality of vertical sealer land assemblies;
 wherein each of the plurality of rollers is supported from the sealer wheel by a roller housing for radially moving the respective roller between an idle position wherein the respective roller is spaced away from the film web in a radially inward direction toward the vertical axis of rotation of the sealer wheel and an extended position wherein the respective roller is moved in a radially outward direction away from the vertical axis of rotation of the sealer wheel and in contact with the film web to support the film web away from the heater of each of the plurality of vertical sealer land assemblies, and wherein contact between the film web and the heater of each of the plurality of vertical sealer land assemblies forms the spaced apart vertical seals along a length of the film web.

16. The pouch machine vertical sealer of claim 15, wherein the plurality of vertical sealer land assemblies are radially fixed.

17. The pouch machine vertical sealer of claim 15, wherein the sealer wheel further includes actuatable upper and lower shifter rings to which each roller housing is operatively coupled for radially moving each roller between the operative position and the extended position.

18. The pouch machine vertical sealer of claim 17, wherein the upper and lower shifter rings each include cam rollers with one cam roller of the upper shifter ring in engagement with a cam drive slot in each roller housing and one cam roller of the lower shifter ring in engagement with a cam drive slot in each roller housing to radially move the plurality of rollers.

19. The pouch machine vertical sealer of claim 18, wherein the upper and lower shifter rings are each operatively coupled to the sealer wheel with an actuatable cylinder configured to rotate the upper and lower shifter rings about the vertical axis of rotation of the sealer wheel to radially move the plurality of rollers.

20. The pouch machine vertical sealer of claim 15, wherein the sealer wheel includes a top slip ring and a bottom slip ring with one of either the top slip ring or bottom slip ring being configured to transmit data between the heater of each of the plurality of vertical sealer land assemblies and a controller and the other one of the top slip ring or bottom slip ring being configured to transmit power to the at least one heater of each of the plurality of vertical sealer lands.

21. The pouch machine vertical sealer of claim 15, wherein the heater is an impulse heater.

* * * * *

UNITED STATES PATENT AND TRADEMARK OFFICE
CERTIFICATE OF CORRECTION

PATENT NO. : 12,227,327 B2
APPLICATION NO. : 18/245642
DATED : February 18, 2025
INVENTOR(S) : Milo M. Vaniglia and Robert M. Kalany It is certified that error appears in the above-identified patent and that said Letters Patent is hereby corrected as shown below:

In the Specification

In Column 1, Line 50, change "films become increasing important due to the difficulty" to --films become increasingly important due to the difficulty--.

In Column 2, Lines 29-30, change "temperature of these conventional lands remains substantial unchanged and" to --temperature of these conventional lands remains substantially unchanged and--.

In Column 3, Line 7, change "each of the plurality vertical sealer land assemblies." to --each of the plurality of vertical sealer land assemblies.--.

In Column 5, Line 1, change "FIG. 2 is top view of the pouch machine" to --FIG. 2 is a top view of the pouch machine--.

In Column 5, Line 8, change "FIGS. 2C and 2D are a cross-sectional views" to --FIGS. 2C and 2D are cross-sectional views--.

In Column 5, Lines 51-52, change "wheel of FIG. 6, illustrating the movable rollers an idle position." to --wheel of FIG. 6, illustrating the movable rollers in an idle position.--.

In Column 7, Line 40, change "quantity of substance, such as powered food, is placed inside" to --quantity of substance, such as powdered food, is placed inside--.

In Column 8, Lines 59-60, change "continuous film web 14 is conveyed onto the sealer wheel 26 and into contact the individual vertical sealer lands 34." to --continuous film web 14 is conveyed onto the sealer wheel 26 and into contact with the individual vertical sealer lands 34.--.

In Column 11, Line 14, change "Each of these companies offer" to --Each of these companies offers--.

Signed and Sealed this
Second Day of September, 2025

Coke Morgan Stewart
*Acting Director of the United States Patent and Trademark Office*

In Column 11, Lines 36-37, change "The cooling medium 94 may fluid or" to --The cooling medium 94 may be fluid or--.

In Column 13, Line 65, change "the lower shifter ring 120, each of which are configured to" to --the lower shifter ring 120, each of which is configured to--.

In Column 14, Lines 54-56, change "With reference to FIGS. 5 and 5A, rotation of the upper shifter ring and the lower shifter ring 118, 120, in the clockwise direction, as indicated by directional arrow A3, is causes the land housings 108" to --With reference to FIGS. 5 and 5A, rotation of the upper shifter ring and the lower shifter ring 118, 120, in the clockwise direction, as indicated by directional arrow A3, causes the land housings 108--.

In Column 15, Lines 30-35, change "The primary differences between ... and ... is that the vertical sealer land assemblies 32 are radially fixed relative to a sealer wheel 202 of the ... and the rollers 104 are movably coupled to the sealer wheel 202 with a" to --The primary differences between ... and ... are that the vertical sealer land assemblies 32 are radially fixed relative to a sealer wheel 202 of the ... and the rollers 104 are movably coupled to the sealer wheel 202 with a--.

In Column 15, Line 50, change "The sealer wheel 202 also a plurality of rollers" to --The sealer wheel 202 also has a plurality of rollers--.

In Column 16, Lines 30-31, change "associated roller 104 between the idle position the extended position during" to --associated roller 104 between the idle position and the extended position during--.

In Column 16, Line 32, change "In this regard, FIGS. 7 and 7A illustrates" to --In this regard, FIGS. 7 and 7A illustrate--.

In the Claims

In Column 19, Lines 29-30, Claim 1, change "wherein contact between the film web and the impulse heater of each of the plurality of" to --wherein contact between the film web and the heater of each of the plurality of--.

In Column 19, Lines 52-54, Claim 7, change "coupled for radially moving each vertical sealer land assemblies between the" to --coupled for radially moving each vertical sealer land assembly between the--.

In Column 20, Line 22, Claim 12, change "the plurality of vertical seal land assemblies;" to --the plurality of vertical sealer land assemblies;--.